(12) United States Patent
Silberman et al.

(10) Patent No.: US 10,861,028 B2
(45) Date of Patent: Dec. 8, 2020

(54) DETECTING AND REDUCING BIAS (INCLUDING DISCRIMINATION) IN AN AUTOMATED DECISION MAKING PROCESS

(71) Applicant: Cerebri AI Inc., Austin, TX (US)

(72) Inventors: Gabriel M. Silberman, Austin, TX (US); Michael Louis Roberts, Austin, TX (US); Jean Belanger, Austin, TX (US); Karen Bennet, Toronto (CA)

(73) Assignee: Cerebri AI Inc., Austin, TX (US)

( * ) Notice: Subject to any disclaimer, the term of this patent is extended or adjusted under 35 U.S.C. 154(b) by 878 days.

(21) Appl. No.: 15/595,220

(22) Filed: May 15, 2017

(65) Prior Publication Data

US 2017/0330058 A1 Nov. 16, 2017

Related U.S. Application Data

(60) Provisional application No. 62/337,311, filed on May 16, 2016.

(51) Int. Cl.
| | |
|---|---|
| *G06N 5/02* | (2006.01) |
| *G06Q 30/02* | (2012.01) |
| *G06Q 10/06* | (2012.01) |
| *G06N 20/00* | (2019.01) |
| *G06K 9/62* | (2006.01) |

(Continued)

(52) U.S. Cl.
CPC ....... *G06Q 30/0201* (2013.01); *G06K 9/6221* (2013.01); *G06K 9/6278* (2013.01); *G06N 5/025* (2013.01); *G06N 7/005* (2013.01); *G06N 20/00* (2019.01); *G06Q 10/067* (2013.01); *G06F 8/35* (2013.01)

(58) Field of Classification Search
None
See application file for complete search history.

(56) References Cited

U.S. PATENT DOCUMENTS

| | | | |
|---|---|---|---|
| 7,765,125 B1 * | 7/2010 | An | G06Q 30/00 705/20 |
| 7,783,565 B1 * | 8/2010 | Ajose | G06Q 40/00 434/323 |

(Continued)

OTHER PUBLICATIONS

Pedreschi et al., "Discrimination-aware Data Mining", Aug. 27, 2008, KDD 2008, pp. 1-9 (Year: 2008).*

(Continued)

*Primary Examiner* — Paulinho E Smith
(74) *Attorney, Agent, or Firm* — Pillsbury Winthrop Shaw Pittman, LLP

(57) ABSTRACT

In some implementations, a computing device determines an event timeline that comprises one or more finance-related events associated with a person. A production classifier may be used to determine (i) an individual contribution of each event in the event timeline to a financial capacity of the person and (ii) a first decision regarding whether to extend credit to the person. A bias monitoring classifier may, based on the event timeline, determine a second decision whether to extend credit to the person. The bias monitoring classifier may be trained using pseudo-unbiased data. If a difference between the first decision and the second decision satisfies a threshold, the production classifier may be modified to reduce bias in decisions made by the production classifier.

20 Claims, 14 Drawing Sheets

(51) Int. Cl.
*G06N 7/00* (2006.01)
*G06F 8/35* (2018.01)

(56) References Cited

U.S. PATENT DOCUMENTS

| | | | | |
|---|---|---|---|---|
| 10,019,988 | B1* | 7/2018 | Chan | G06F 16/683 |
| 10,599,699 | B1* | 3/2020 | Bartolome | G06F 16/337 |
| 2006/0080241 | A1* | 4/2006 | Comstock | G06Q 40/02 705/40 |
| 2014/0236796 | A1* | 8/2014 | Colon Bolea | G06Q 40/04 705/37 |
| 2015/0254777 | A1* | 9/2015 | Beale | G06Q 40/06 705/36 R |
| 2016/0314528 | A1* | 10/2016 | Abbott | G06Q 40/00 |
| 2017/0083679 | A1* | 3/2017 | Feder | G16H 50/30 |
| 2017/0316080 | A1* | 11/2017 | Brisebois | G06F 16/93 |
| 2017/0330058 | A1* | 11/2017 | Silberman | G06Q 30/0201 |
| 2019/0260841 | A1* | 8/2019 | Roberts | G06Q 30/0205 |
| 2019/0340684 | A1* | 11/2019 | Belanger | G06N 7/005 |
| 2019/0378207 | A1* | 12/2019 | Dibner-Dunlap | G06Q 40/02 |
| 2020/0082300 | A1* | 3/2020 | Farrar | G06N 5/04 |
| 2020/0126126 | A1* | 4/2020 | Briancon | G06K 9/6297 |
| 2020/0134493 | A1* | 4/2020 | Bhide | G06N 20/00 |

OTHER PUBLICATIONS

McMahan et al., "Federated Learning: Collaborative Machine Learning without Centralized Training Data," Google AI Blog, https://ai.googleblog.com/2017/04/federated-learning-collaborative.html Apr. 6, 2017 (7 pages).

Internet Archive "Salesforce Einstein: Machine Learning in a Multi-Tenant Environment," https://web.archive.org/web/20170217002707/https://www.salesforce.com/products/ captured Feb. 17, 2017 (7 pages).

* cited by examiner

DETECTING AND REDUCING BIAS (INCLUDING DISCRIMINATION) IN AN AUTOMATED DECISION MAKING PROCESS

RELATED APPLICATIONS

This application claims the domestic benefit under Title 35 of the United States Code § 119(e) of U.S. Provisional Patent Application Ser. No. 62/337,311, entitled "Business Artificial Intelligence Management Engine," filed May 16, 2016, which is hereby incorporated by reference in its entirety and for all purposes as if completely and fully set forth herein.

BACKGROUND OF THE INVENTION

Field of the Invention

The invention relates to machine learning and more particularly to using machine learning to detect and reduce bias in an automated decision making process, such as, for example, whether to provide a particular amount of credit to an individual.

Description of the Related Art

Corporations, government entities, and the like may continually make decisions that take into account a large number of factors. For example, a university may base the decision on whether to offer admission to a student on factors such as the student's grades at another educational institution, the student's extra-curricular activities, the age of the student, the race of the student, social-economic background of the student, and the like. As another example, a lender, such as a bank, may base a decision on whether to extend a particular amount of credit (e.g., mortgage, car loan, etc.) to a person or a business based on a credit score, prior credit history, income, where the person lives, and the like. Such decisions may include some form of bias (e.g., implicit bias) such that, even if an institution considers their decision-making process to be impartial, the results may in fact be biased. Thus, bias can creep into the rules used for approval or denial of an application, such as a credit application, an education institution admissions application, and the like, and the bias may be difficult to detect. Bias refers to making a decision using a decision-making process where the decision favors (or disfavors) certain traits or characteristics, such as gender, age, ethnicity, geographic location, income, and the like. For example, women typically earn significantly less (e.g., approximately ¼ to ⅓ less) than their male counterparts (e.g., in similar jobs and with similar educational backgrounds and experience). When a decision-making process takes annual income into consideration, the resulting decisions may have an implicit bias for males and against females. In some cases, the bias may be sufficiently significant that the bias is discriminatory and therefore illegal.

Even if bias is detected (or alleged by a customer or regulator), the existence (or absence) of the bias may be difficult to prove. Moreover, if bias is determined to be present, identifying which business rules in the decision-making process are contributing to the bias and the relative contribution of each of the business rules to the bias may be difficult to ascertain.

Corporations, government institutions, and other decision makers may desire to arrive at a decision and provide a straightforward explanation of the process used to arrive at the decision. For example, the decision-making process should be auditable and sustainable over time, to accommodate changes in business rules, applicant profiles, and regulatory considerations. Decision makers may desire to detect bias in the decision-making process, identify the rules contributing to the bias, and modify the rules to reduce the contribution of each of the rules to a negligible (e.g., below a threshold) amount. To guard against bias creeping in to the decision-making process, the decision makers may desire a system that continuously monitors decisions, detects bias, and modifies the appropriate rules to reduce the bias.

The purpose of the decision-making process is to make decisions that benefit the decision maker. For example, lenders desire to extend credit to credit worthy entities (individuals or businesses) while not extending credit to unworthy entities. When the decision-making process is biased, a lender may extend credit to an entity that may be unworthy (e.g., defaults on a loan) or the lender may deny credit to an entity that would have benefitted (e.g., profited) the decision maker.

As computational power continues to increase, artificial intelligence (AI)-based solutions, such as machine learning, may be used to perform decision making. In such cases, identifying the causes of bias and the contribution of each cause of bias may be extremely complicated because the machine learning model that is being used to make decisions must be reverse-engineered to identify the business rules being used. In addition, if the AI-based solution is provided via application programming interface (API) calls to a "black box" (e.g., software as a service (SaaS)), then reverse engineering the decision process may not be possible because both the model used by the SaaS provider and the data used to train the model may be unknown.

SUMMARY OF THE INVENTION

In some implementations, a computing device determines an event timeline that comprises one or more finance-related events associated with a person. A production classifier may be used to determine (i) an individual contribution of each event in the event timeline to a financial capacity of the person and (ii) a first decision regarding whether to extend credit to the person. A bias monitoring classifier may, based on the event timeline, determine a second decision whether to extend credit to the person. The bias monitoring classifier may be trained using pseudo-unbiased data. If a difference between the first decision and the second decision satisfies a threshold, the production classifier may be modified to reduce bias in decisions made by the production classifier.

DETAILED DESCRIPTION

Figure 1:
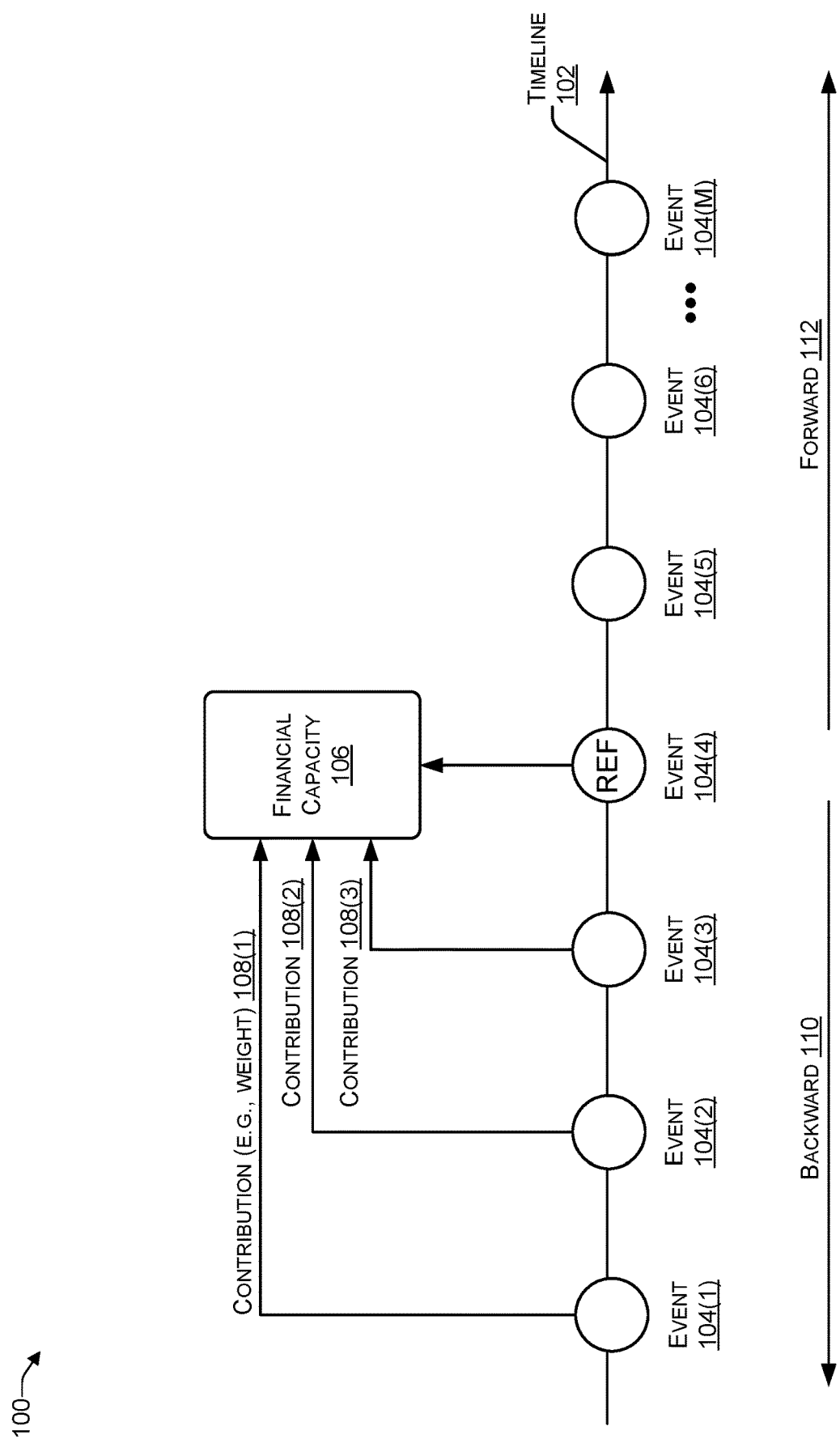
FIG. 1 is a block diagram illustrating an event timeline (e.g., factors in a decision) according to some embodiments.

The systems and techniques described herein may be used to detect bias in an automated decision-making process, identify the particular rules in the automated decision-making process that are causing the bias, determine the relative contribution of each particular rule to the bias, and modify the particular rules to reduce the contribution of the particular rules to the bias. Decisions made by the automated decision-making process may be monitored to determine whether any of the decisions were biased. When bias is detected, the rules contributing to the bias may be identified and modified to reduce the bias. Thus, the business rules may be repeatedly modified to reduce bias when bias is detected in decisions.

A production model (PM) refers to a machine learning model (e.g., algorithm) that has been trained using historical data to make decisions. A bias monitoring model (BMM) refers to a machine learning model that has been trained using unbiased (or pseudo-unbiased) data. For ease of discussion, many of the examples provided herein use a model that provides a binary, e.g., yes or no, decision (result). For example, a PM may be used to determine whether or not to extend a particular amount of financing (e.g., mortgage, loan, or the like) to an individual or a business, whether or not to offer University admission to an applicant, or other binary decisions. However, it should be understood that the systems and techniques described herein may be used to make decisions with non-binary results. For example, the systems and techniques may determine a financial capacity (FC) of an individual or a business and identify a recommended amount of financing or credit to extend. To illustrate, an individual buying a home may desire to know an amount of a mortgage that the individual qualifies for or the individual may request a mortgage for a specific amount. The systems and techniques may determine the individual's FC and provide a decision based on the FC, e.g. "You qualify for a $100,000 mortgage" or "You don't qualify for a $120,000 mortgage but you do qualify for a $100,000 mortgage".

When an applicant provides an application (e.g., for admission to a university, for a car loan or mortgage, or the like), both the PM and BMM may each be used to make a decision. If the two decisions are identical (or differ by less than a predetermined threshold), then the decision may be used. For example, if both decisions are to extend credit, then the applicant's request for a mortgage or a loan may be accepted. If both decisions are to deny credit, then the applicant's request for a mortgage or a loan may be denied. If the two decisions are not identical (or differ by at least the predetermined threshold), then a set of rules may determine which decision to select. For example, for a credit application, if one of the decisions is to extend credit and the other decision is to deny credit, the financial institution may use a rule that credit is always extended, to avoid accusations that the decision was biased. Differing decisions between the PM and BMM may indicate bias in the PM. The rules used by the PM may be modified and the PM retrained to reduce bias.

The systems and techniques take a holistic view of a customer by using available data. For example, for a credit application, the data may include internal events and external events. The internal events may include events specific to the individual applicant, such as a car loan approval, use of a bank overdraft feature, loan (e.g., mortgage, car loan etc.) payments, payroll deposits, credit limit increases, and the like. The external events may include events, such as social media posts by the applicant (e.g., applicant posts about accepting a new job), social media posts associated with the applicant (e.g., relatives of the applicant post about a new job the applicant has accepted), Federal Reserve rate hikes or guidance, national unemployment statistics, inflation numbers, and the like.

For example, one or more processors (e.g., on a computing device, a server, or a cloud-based computing service) may execute instructions to perform various operations. The operations may include determining an event timeline that comprises one or more finance-related events (e.g., making a payment on a loan, receiving a direct deposit of a salary payment, and the like) associated with a person, determining, using a production classifier (e.g., a machine learning model), an individual contribution of each event in the event timeline to a financial capacity of the person, and determining, using the production classifier and based on the first set of contributions, a first decision whether to extend credit to the person. In some cases, the contributions may be expressed as weights (e.g., weighted amounts). A bias monitoring classifier (e.g., model) may be used to process the event timeline to arrive at a second decision as to whether to extend credit to the person. The bias monitoring classifier may be trained using unbiased (or pseudo-unbiased) data to make reference decisions. If the production classifier and bias monitoring classifier make the same decisions, then the production classifier may be making unbiased decisions. If the production classifier and bias monitoring classifier make different decisions (or decisions that differ by more than a threshold amount), then the production classifier may be making biased decisions. A difference between the first decision and the second decision may be determined and a determination may be made whether the difference between the first decision and the second decision satisfies a threshold. A policy may be used to select either the first decision or the second decision.

The individual events in the event timeline may be grouped into a plurality of categories, such as, for example, one or more demographics, one or more locations, one or more financial events, one or more educational levels, or other event type. For each category, individual events may be characterized as having either a positive outcome or a negative outcome. For example, a positive outcome may increase the financial capacity of the person while a negative outcome may decrease the financial capacity of the person. For each set of contributions grouped into each category, a probability distribution associated with the set of contributions may be determined. A mean, a median, or both may be determined for each of the probability distributions.

The finance-related events may include internal events and external events. For example, internal events may include a loan approval, use of a bank overdraft, a loan payment, a payroll deposit, or a credit limit increase while external events may include finance-related social media posts, a change to a bank rate, an unemployment statistic, or an economic statistic.

The first decision may be determined to include bias based at least in part on (i) the second decision (e.g., made by the bias monitoring classifier) and (ii) the difference between the first decision and the second decision. If the first decision includes bias, the production classifier may be modified to reduce the bias.

A conflict counter may be incremented each time the difference between the first decision and the second decision satisfies the threshold. If the conflict counter satisfies a second threshold, e.g., indicating that decisions made by the bias monitoring classifier differ from decisions made by the production classifier, then at least one of the production classifier or the bias monitoring classifier may be modified. For example, the rules of at least one of the production classifier or the bias monitoring classifier may be modified or at least one of the production classifier or the bias monitoring classifier may be retrained using newer (e.g., updated) data to reduce bias.

Bias may cause unintentional discrimination based on race, gender, nationality, or the like. By reducing bias to a relatively small amount (e.g., below a predetermined threshold), a business or a university may be able to avoid lawsuits or other actions alleging discriminatory lending practices, discriminatory admission practices, and the like. In addition, the bias monitoring classifier (e.g., model) enables the business or university to demonstrate the lack (or relatively small amount) of bias in the decision-making process, thereby averting potentially costly and time consuming legal action.

FIG. 1 is a block diagram 100 illustrating an event timeline according to some embodiments. A timeline 102 may include one or more events 104(1), 104(2), 104(3), 104(4), 104(5), 104(6), to 104(M) (where M>0). The event timeline 102 may include internal events and external events. The systems and techniques described herein may be used to traverse the timeline 102 to identify reference events, such as a representative reference event 104(4). A reference event is an event of interest to the decision maker and that satisfies one or more criteria (e.g., as established by the decision maker). For ease of understanding, the examples provided herein are related to determining whether or not to extend credit (e.g., financing), such as a mortgage or a loan, to an individual or business. However, it should be understood that the systems and techniques described herein may be applied for other types of decision making, such as admission into an institution of higher learning (e.g., a University).

For a credit decision, a reference event may be a major purchase, e.g., a purchase whose dollar amount satisfies a predetermined threshold (e.g., $1000, $2000, $5000, $10,000, or the like). In this example, setting the threshold to $5000 would result in the identification events, such as the purchase of a car, purchase of a boat, purchase of a house, or the like, as reference events. In contrast, events such as purchasing appliances for the house, having the car serviced, or the like may be determined to be non-reference events. Another example of a reference event is a high-water mark of a total net worth based on the financial accounts associated with an individual or a business within a predetermined period of time (e.g., calendar year). For example, the high-water mark may be determined by subtracting a current value of liabilities from a current value of assets. Assets may include one or more of account balances (e.g., checking/savings account balance), financial holdings (e.g., stocks, bonds, and the like), retirement savings (e.g., individual retirement account (IRA), 401 (k), and the like), real estate property values, and the like. Liabilities may include one or more of credit card balances, line of credit usage, loans, mortgages, and the like. For a business, a reference event may include a value grounding event, such as an initial public offering (IPO), an acquisition of the business by another business, market capitalization based on a current stock value, and the like. For a student applying for admission, the reference events may include a grade point average (GPA) for each course the student has taken at other educational institutions, scholarships received, and the like.

In terms of a credit decision, each of the events 104 may include an internal or external financially-related event. For example, internal events may include events such as approval of a loan (e.g., car loan), loan payments, use of a bank account overdraft, mortgage payments, payroll deposit, increase in a home equity line of credit, and other types of financial transactions associated with an individual (or a business). External events may include events such as social media posts (e.g., tweet on landing a freelance job, posting photos of an accident, tweet on graduation), financially-related events (e.g., rate hike by the Federal Reserve, report of looming real estate bubble, jobs/unemployment report, etc.), and other external events.

The decision maker may use the systems and techniques described herein to determine a financial capacity 106 (e.g., of an individual or a business) associated with the reference event 104(4) and determine a contribution 108(1) associated with the event 104(1), a contribution 108(2) associated with the event 104(2), and a contribution 108(3) associated with the event 104(3). The contributions 108(1), 108(2), and 108(3) may each either increase or decrease the financial capacity 106. The events 104(1), 104(2), 104(3) may each be associated with a negative weight or a positive weight (e.g., on a scale between −1.00 and 1.00) to describe the event's contribution to the reference event 104(4). The weights 108(1) to 108(P) in each category may be a weighted sum that indicates the relative importance (e.g., contribution) of each event to the reference event or the financial capacity. For example, event 104(1) may be making a loan or mortgage payment, event 104(2) may be the Federal Reserve lowering interest rates, and event 104(3) may be receiving a payroll deposit. The contribution 108(1) (e.g., weight) may be −0.1 (e.g., negative 10%), the contribution 108(2) may be 0.2 (e.g., 20%), and the contribution 108(3) may be 0.9 (e.g., 90%). Thus, −0.1+0.2+0.9=1.00.

After the reference event (e.g., event 104(4)) occurs, additional (e.g., subsequent) events may occur and weights may be assigned to each of the subsequent events. For example, the event 104(5) may include receiving approval for a car loan. The event 104(6) may include a social media post about selling a collectible on an auction site for a particular amount of money. For example, the individual may have sold a rare stamp, a rare coin, a photo autographed by a celebrity, or other collectible. The event 104(M) may include the customer purchasing an accessory for a car.

The dollar amount of the contribution of each event to the financial capacity 106 is calculated by using the amount of the reference event 104(4) as 100% (e.g., 1.00), multiplied by the relative contribution of each event. The relative contribution of preceding events (e.g., events 104(1), 104(2), 104(3) before the reference event 104(4)) add up to 100% (e.g., 0.10), while subsequent events (e.g., events 104(5), 104(6), 104(7) after the reference event 104(4)) may not add up to 100%. The systems and techniques described herein enable a value to be assigned to each event in the timeline 102, include events prior to the reference event 104(4) and events subsequent to the reference event 104(4). For example, a model (e.g., PM and BMM) may move backward 110 through the timeline 102 and assign relative (e.g., contributory) values to the prior events (e.g., 104(3), 104(2), and 104(1)). The algorithm may move forward 112 and assign relative (contributory) values to the subsequent events (e.g., 104(5) to 104(M)).

Each of the contributions 108 (e.g., weights) may be determined by features, such as, for example, positive financial transactions (e.g., timely payment of credit cards/loans or mortgage, regular payroll deposits, tax refund, house sale, etc.), negative financial transactions (e.g., late or non-payment of credit cards/loans or mortgage, default on loan or mortgage, unemployment insurance deposit, etc.), education (e.g., university tuition payment, appellations added to an individual's name, such as "Dr." "ESQ", "MSW", or the like), lowering of interest rates (e.g., an external event which impacts a variable rate loans, such as credit cards, variable rate mortgages, and the like).

After determining the financial capacity 106, the timeline 102 may be modeled as a set of sub-sequences (e.g., portions of the timeline 102) yielding a value for the financial capacity 106 based on the reference event 104(4). Using machine learning techniques (e.g., support vector machine, neural networks, Bayesian, or the like), the individual contributions 108(3), 108(2), 108(1) of the preceding events 104(3), 104(2), 104(1), respectively, can be estimated, similar to the way that connection weights in a neural network are determined, or similar to the way that the evidentiary weight of facts in a Bayesian network are computed.

Figure 2:
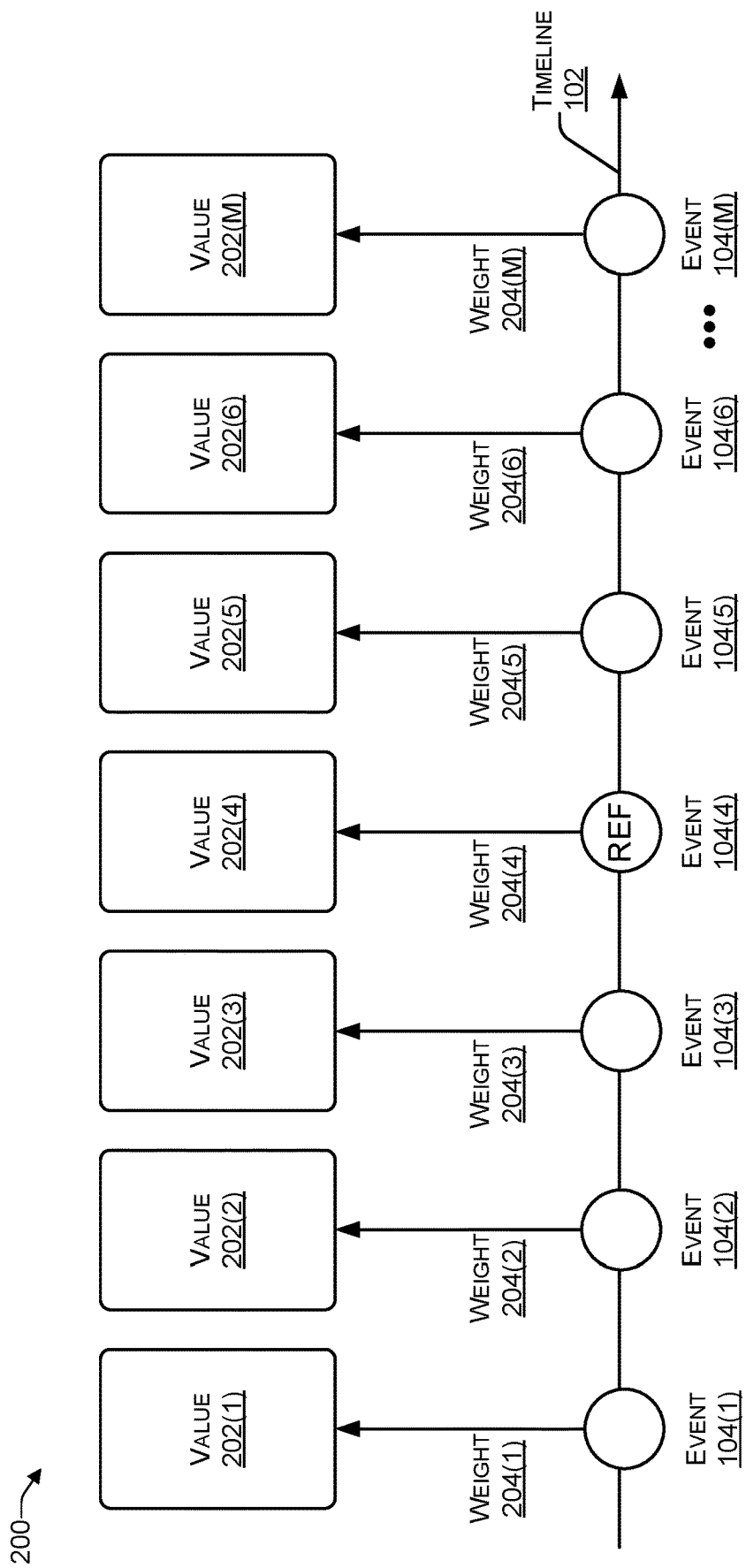
FIG. 2 is a block diagram illustrating determining a value (e.g., contribution) for events in an event timeline according to some embodiments.

FIG. 2 is a block diagram 200 illustrating determining a value for events in an event timeline according to some embodiments. After reference events in the event timeline 102 have been identified, a value index may be determined for each reference event. For example, a value index 202(4) may be determined for the reference event 104(4). Machine learning may be used to estimate the contributions 108 (e.g., weight) of the events before and after the reference event 104(4).

An incremental (e.g., contributory) value 202 may be determined and assigned to each non-reference event in the timeline 102. For example, value 202(1) may be determined and assigned to event 104(1), value 202(2) may be determined and assigned to event 104(2), and so on (excluding the reference event 104(4)) up to determining value 202(M) for event 104(M). After the values 202 have been determined (e.g., estimated using machine learning) and assigned to each event in the timeline 102, the algorithm may go back through the timeline 102 to determine (e.g., estimate using machine learning) event weights 204, using sub-sequences of the timeline 102. A sub-sequence of the timeline 102 is a portion of the timeline 102 that includes at least one reference event. For example, in FIG. 1, events 104(1) to 104(4) may be a sub-sequence of the timeline 102 that includes the reference event 104(4). Thus, each event 104 is assigned a value 202. The value 202 of each event 104 may be considered a component of the value of one or more subsequent events.

The accuracy of the value indexes increases as the amount of data (e.g., internal events and external events) increases, e.g., more data means more accurate value indexes. For a credit decision, the internal events may be gathered from financial accounts (e.g., bank account, credit card account, loan/mortgage account, or the like) associated with an individual or business. The external events may be gathered from social media, internet forum postings, relevant news items, macroeconomic data and forecasts, and the like.

For example, a financial institution may, based on the value indexes 202 of financial transactions (e.g., included in the events 104) associated with an entity (e.g., an individual or a business), provide the entity with credit offerings specifically tailored to the entity's preferences and based on the entity's ability to service the corresponding debt.

Figure 3:
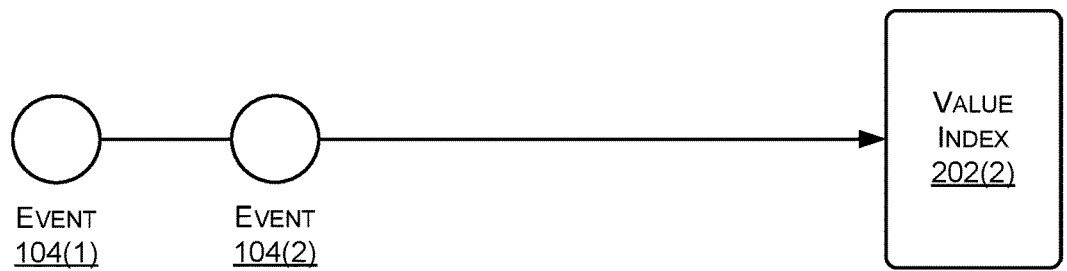
FIG. 3 is a block diagram illustrating evaluating sub-sequences according to some embodiments.
Figure 3:
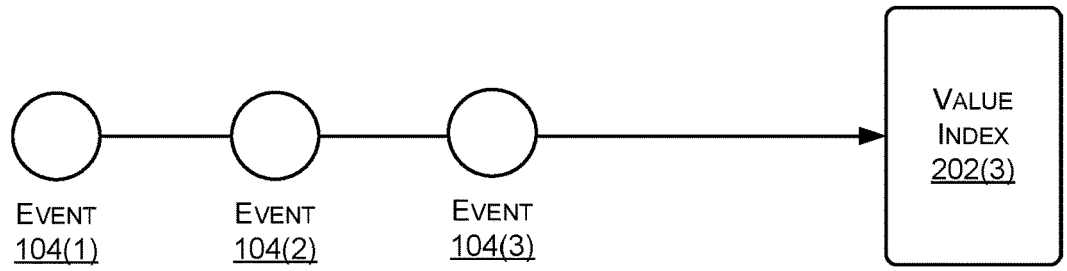
Figure 3:
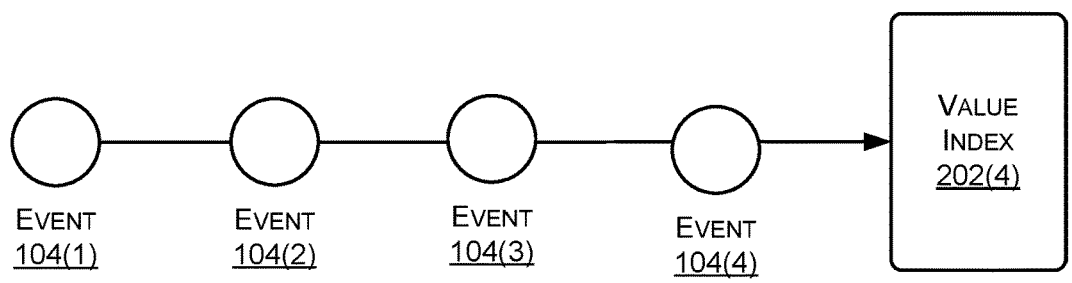

FIG. 3 is a block diagram 300 illustrating evaluating sub-sequences according to some embodiments. Sub-sequences may be used to iterate and determine each event's weight, and each event's value index. Each iteration includes estimating weights and calculating intermediate index values, until convergence within an acceptable tolerance is achieved. For example, the sub-sequence 104(1), 104(2), 104(3), and 104(4) may be iterated over to determine the VI 202(2), 202(3), and 202(4). To illustrate, the sub-sequence 104(1), 104(2) may be iterated over to determine the VI 202(2), the sub-sequence 104(1), 104(2), 104(3) may be iterated over to determine the VI 202(3), and the sub-sequence 104(1), 104(2), 104(3), and 104(4) may be iterated over to determine the VI 202(4).

Figure 4:
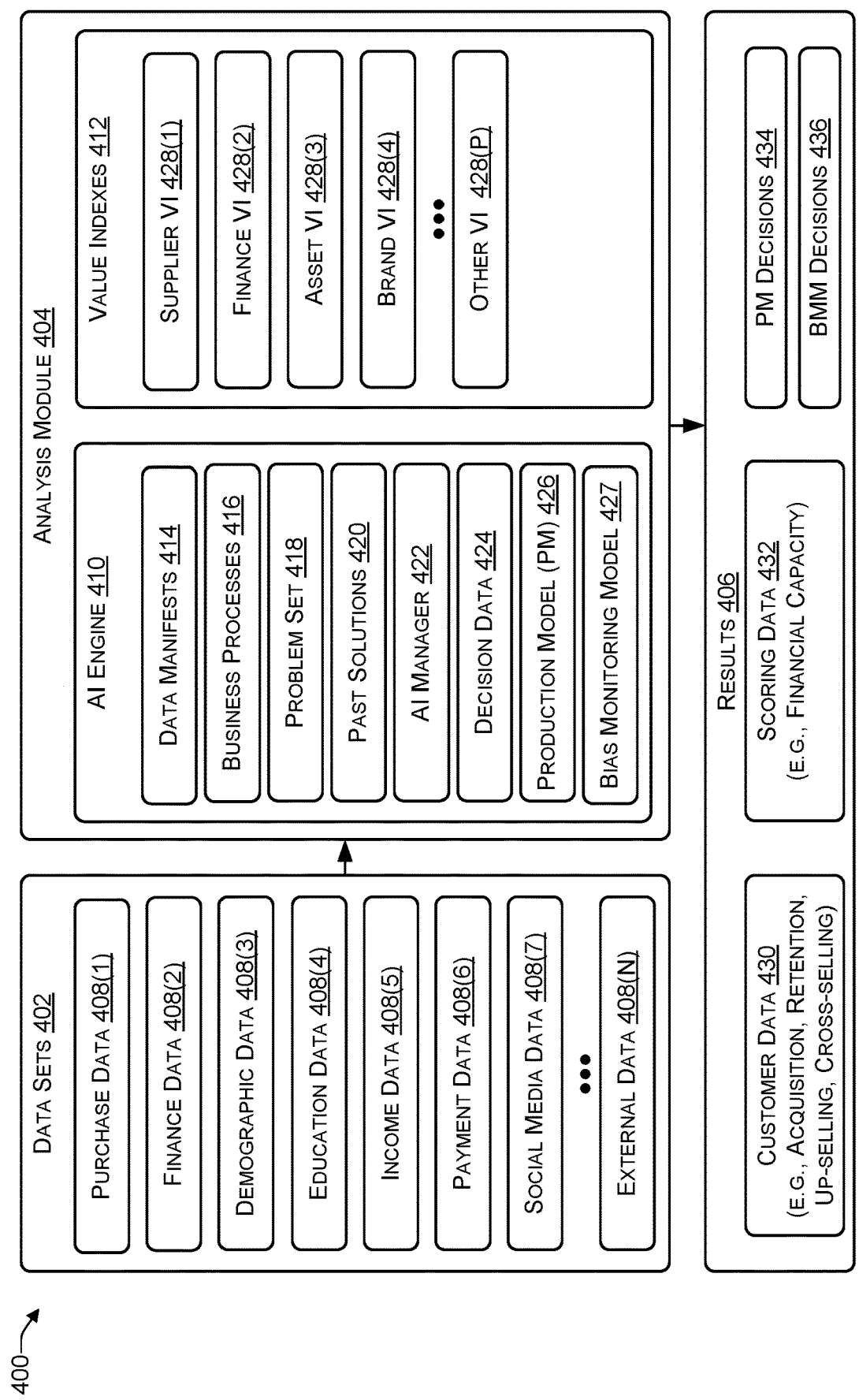
FIG. 4 is a block diagram illustrating an architecture to monitor decisions and detect and reduce bias according to some embodiments.

FIG. 4 is a block diagram illustrating an architecture 400 to analyze event timelines according to some embodiments. In the architecture 400, multiple data sets 402 may be analyzed by an analysis module 404 to produce one or more results 406. While the operation of the architecture 400 is illustrated using credit-related decisions, the architecture 400 may be used to make other decisions, such as whether to admit a student to an institute of high learning (e.g., based on their grades, extra-curricular activities, social media postings, and the like), how much credit to extend to an individual or business (e.g., rather than whether or not to extend a particular amount of credit), and the like.

For example, the data sets 402 may include purchase data 408(1) (e.g., house purchase, car purchase, and the like), finance data 408(2) (e.g., consumer financing such as credit cards), demographic data 408(3) (e.g., customer's age, income, zip code, and the like), education data 408(4) (e.g., education background), income data 408(5) (e.g., payroll direct deposit amounts, rental income, income from stocks and bonds, and the like), payment data 408(6) (e.g., mortgage payments, loan payments, credit card payments, and the like), social media data 408(7) (e.g., posts on Facebook®, Twitter®, and the like), and external data 408(N) (e.g., changes by the Federal Reserve to the interest rate, jobs/unemployment report, and other finance-related events), where N>0. Of course, the data sets 402 may include other types of data (e.g., other internal events and external events) associated with an individual or business.

The analysis module 404 may include an artificial intelligence (AI) engine 410 to perform an analysis of the data sets 402 (including internal and external events) and to determine the value indexes 404 based on the analysis. AI engine 410 may use machine learning, such as a classifier (e.g., support vector machine, neural network, Bayesian, or other classifier), to analyze the data sets 402 to determine value indexes 412. Data manifests 414 may identify where each of the data sets 402 are stored and how they are accessed. Business processes 416 may identify business processes of financial institutions, etc. Problem set 418 may define the problem(s) to be solved by the analysis module 404 (e.g., whether to provide credit, how much credit to provide, whether to admit a student, and the like) and may be used with a context engine to correlate the problem set to historical data. For example, historical data associated with individuals or businesses who previously took out a loan (or mortgage) may be analyzed to determine an amount of the previous loans, whether the previous loans were paid back ahead of schedule, whether any payments were missed, whether the previous loans were defaulted on, etc. An analysis of the historical data may be correlated with the current data to identify patterns. For example, the historical data may indicate that people with a particular educational background can payback a loan of a particular amount but may have difficulties paying back a loan greater than the particular amount (e.g., $5000). An AI manager 422 may manage the various processes to derive the value indexes 412. The decision data 424 may include a decision, such as whether or not to extend credit (e.g., provide a loan) to an individual or business, how much credit to extend to an individual or a business, whether to admit a student to a university, whether to offer a scholarship to an application (e.g., student), whether to offer a full or partial tuition waiver to an applicant, etc.

A production model (PM) 426 may be a first machine learning model that incorporates a decision maker's business rules to make PM decisions 434. A bias monitoring model (BMM) 427 may be a second machine learning model that is trained using unbiased data (or pseudo-unbiased data) to make BMM decisions 436. The PM decisions 434 may be compared with the BMM decisions 436 to determine whether the PM decisions 434 exhibit bias and to identify which factors are contributing to the bias. The AI engine 410 may modify the business rules modified to reduce the bias in the PM decisions 434.

The value indexes 412 may be related to a customer, a supplier, or an asset, and may include a supplier VI 428(1) associated with each supplier of credit, a finance VI 428(2) including value indexes related to a customer's propensity to respond favorably to up-selling and cross-selling (e.g., selling a warranty with a used car loan, selling a home warranty with a home purchase, etc.), an asset VI 428(3) including value indexes of assets owned by an individual or in an individual's financial institution portfolio (e.g., property, products, services, and the like), brand VI 428(4) identifying the value that each customer places on each decision maker's brand, and other VIs 428(P) (where P>0) associated with each customer or supplier of credit.

The results 406 may include customer data 430, scoring data 432, PM decisions 434, and BMM decisions 436. The customer data 430 may include information, such as how to acquire particular types of customers (e.g., income greater than X) based on their values, how to retain customers based on their values, how to sell (e.g., new sales, up-sell, and cross-sell) to customers based on their values, etc. The scoring 432 may be information related to customer credit cores, such as the FICO® score, the customer's financial capacity, etc. For university admissions, the scoring data 432 may include a score associated with a particular applicant and that takes into account the applicant's age, grades at other educational institutions, financial capacity (e.g., to pay tuition), extracurricular activities, and the like. The PM decisions 434 may include credit decisions made using the decision maker's business rules (e.g., the decision maker's decision process), such as whether to extend credit to an individual or a business, how much credit to extend to an individual or a business, and the like. The BMM decisions 436 may include credit decisions made using a model trained using unbiased (or pseudo-unbiased) data. Thus, the BMM decisions 436 may be viewed as unbiased decisions and may be used as a reference with which to compare the PM decisions 434.

In the flow diagrams of FIGS. 5, 6, 7, 8, 9, 10, and 11, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, 700, 800, 900, 1000, and 1100 are described with reference to FIGS. 1, 2, 3, and 4 as described above, although other models, frameworks, systems and environments may be used to implement these processes.

Figure 5:
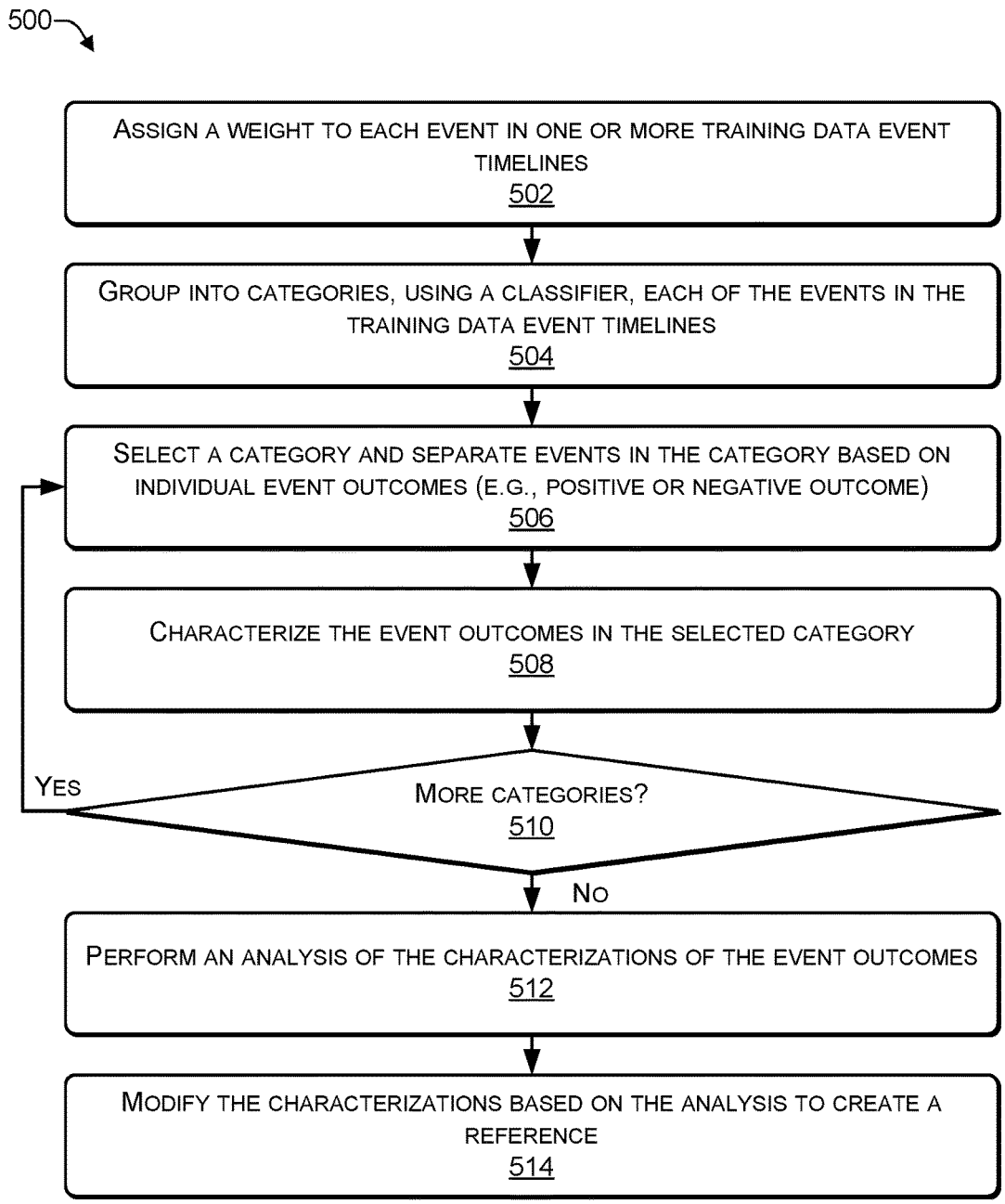
FIG. 5 is a flowchart of a process that includes performing an analysis of characterizations of event outcomes according to some embodiments.

FIG. 5 is a flowchart of a process 500 that includes performing an analysis of characterizations of event outcomes according to some embodiments. For example, the process 500 may be performed by one or more components (e.g., the AI engine 410) of the architecture 400 of FIG. 4. The process 500 may be used to create an unbiased (or pseudo-unbiased) reference.

At 502, a weight (e.g., contribution) may be assigned to individual events in one or more training data event timelines. For example, in FIG. 1, the contribution of individual events in each of the event timelines, such as the events 104(1), 104(2), 104(3), to a reference event, financial capacity, or both may be determined.

At 504, a classifier (e.g., machine learning model) may be used to group individual events in the training data event timelines into multiple categories. For example, in FIG. 11, a machine learning model may be used to group (e.g., classify) individual events (e.g., located in training documents that include multiple event timelines) into multiple categories. The categories may include similar demographics, location (e.g., same zip code, adjacent zip codes, same city, same state, or the like), financial events, and the like. The demographic categories may include a same or similar occupation, same age, age falls within one of multiple ranges (e.g., 21-25, 26-30, 31-35 etc.), household income falls within one of multiple ranges (e.g., $51,000 to $75,000, $76,000 to $100,000, $101,000 to $125,000, etc.), same or similar level of education (e.g., diploma, Bachelor's degree, Master's degree, PhD degree, medical degree, legal degree, or the like), nationality, religion, ethnicity, and the like. The financial events may include events such as, for example, paying off a loan (or mortgage), an income level or income bracket, loan (or mortgage) default, late payment(s) on a loan (or mortgage), laid off from job, declaring bankruptcy, and the like. When grouping events in event timelines into categories, the model may, for example, group similarly named events into a category, group events in a predefined "class" (e.g., internal or external, financial or social, direct or indirect), and the like. A category may be a same or similar address (e.g., same zip code, same neighborhood, same city, same state, or the like), same or similar demographic (e.g., based on age, gender, ethnicity, race, profession, income level, or the like), same type of outcome (e.g., positive or negative outcome), or the like. In some cases, an iterative process may be used to create a hierarchical set of categories. For example, the model may group events into broad categories (e.g., internal or external), then group events in the broad categories into narrower categories, group events in the narrower categories into even narrower categories, and so on. Thus, an individual category with more than a threshold number of events may be analyzed and sub-divided into narrower categories, and so on until there are no categories with more than the threshold number of events.

At 506, a category of the multiple categories may be selected and events in a selected category may be separated based on an event outcome associated with each event. For example, each category may include events with positive outcomes (e.g., loan approval, mortgage approval, job offer, paid off loan, paid off credit card, and the like) and negative outcomes (e.g., missed loan payment, defaulted on loan, was laid off or fired from job, and the like). For a model that makes binary decisions (e.g., yes or no), the outcomes may be classified as either a positive outcome (e.g., loan was granted) or a negative outcome (e.g., loan was denied). For a model that makes non-binary decisions, the classifications may be further refined. For example, an individual (or a business) may apply for a $200,000 loan (e.g., home mortgage) but may be granted a $160,000 loan. In this example, the result is 80% positive because the applicant received 80% of the requested loan amount. As another example, a student applying for admission to a University may also apply for several scholarships. A binary model may classify the application as positive (admission granted) or negative (admission not granted). A non-binary model may classify based on whether admission was granted and an amount of the scholarships granted relative to the tuition. For example, admission granted may be classified as 60% (e.g., positive) while the remaining 40% may be scaled based on to what extent the scholarships cover the cost of tuition. If the scholarships cover 100% of the tuition, the classification may be 100%, if the scholarships cover 50% of tuition, the classification may be 80% (e.g., 60% for admission plus half (50%) of the 40% for scholarship=80%).

At 508, individual event outcomes in the selected category may be characterized. For example, a mathematical analysis may be performed for each particular category to determine a mean of the particular category, a median of the particular category, an average of the particular category a standard deviation for the particular category, or the like. The mathematical analysis may take into consideration the weights of the particular category as a whole, individual weights of individual events in each category, or using event type granularity, taking into account time proximity to a reference event, etc. The mathematical analysis may be done via machine learning models.

At 510, a determination may be made whether there are additional categories to be selected. In response to determining, at 510, that there are additional categories to be selected, the process proceeds to 506 where a next category may be selected. The process may repeat 506, 508, and 510 until all categories have been selected and the events in each selected category have been characterized.

In response to determining, at 510, that there are no more categories to be selected, the process proceeds to 512 and an analysis of the characterizations of the event outcomes may be performed. At 514, the characterizations may be modified based on the analysis to create a reference. For example, the characterizations of the event outcomes may be examined (e.g., by a human, by a machine learning algorithm, or both) to determine whether any characterizations should be added, removed, or modified to increase bias detection. The resulting characterizations may be used as an unbiased (e.g., pseudo-unbiased) reference to detect bias.

Figure 6:
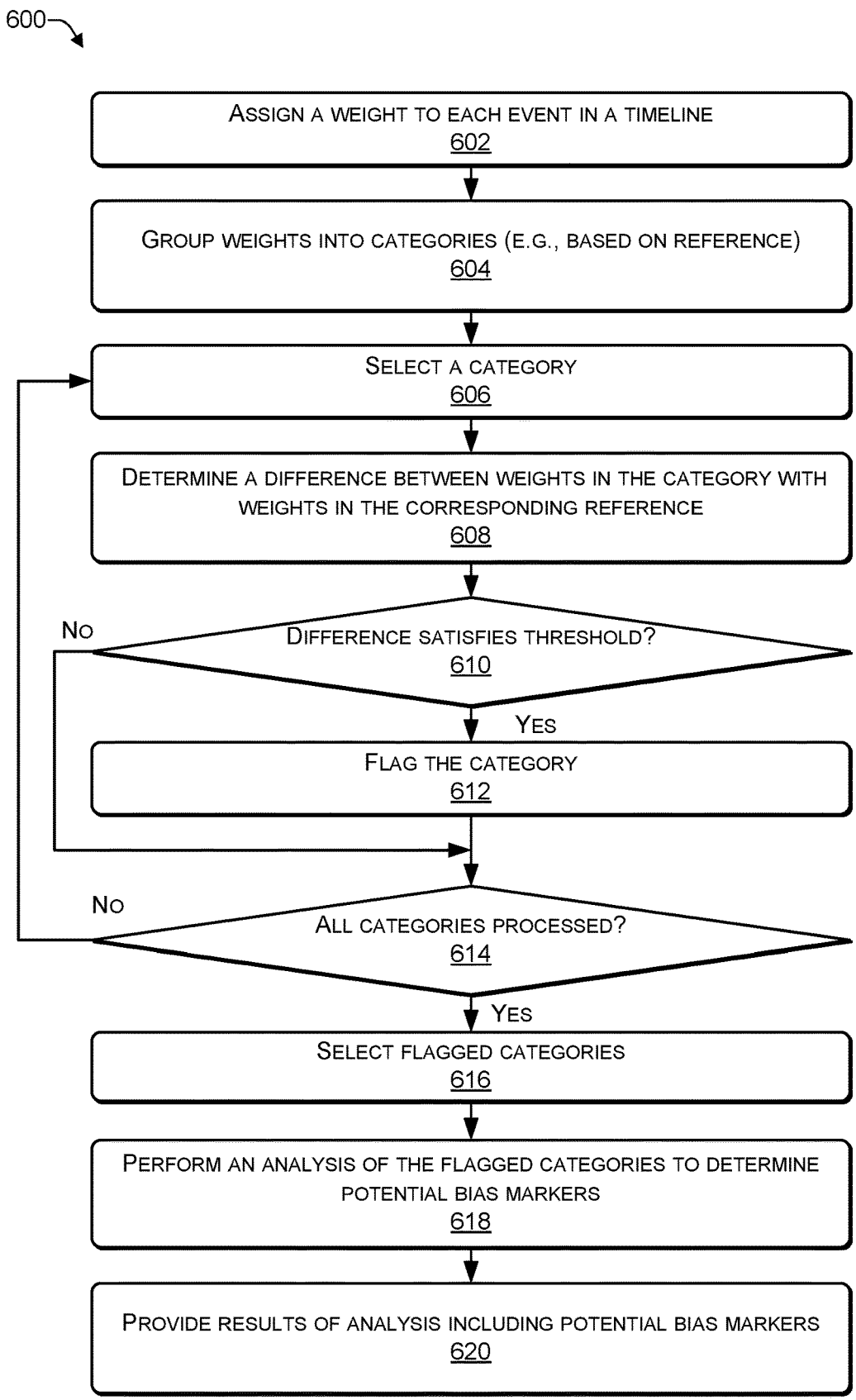
FIG. 6 is a flowchart of a process that includes determining potential bias markers according to some embodiments.

FIG. 6 is a flowchart of a process 600 that includes determining potential bias markers according to some embodiments. For example, the process 600 may be performed by one or more components (e.g., the AI engine 410) of the architecture 400 of FIG. 4. The process 600 may be used to compare weight categories created by a PM with the reference weight categories created using the process 500 of FIG. 5.

At 602, a weight (e.g., contribution as described in FIG. 1) may be assigned to each event in a timeline (e.g., associated with an applicant). For example, in FIG. 1, the contribution of individual events, such as the events 104(1), 104(2), 104(3), to the financial capacity 106 associated with an individual (or business) may be determined.

At 604, individual weights (e.g., contributions as described in FIG. 1) may be grouped into categories based on a corresponding reference (e.g., the reference created by the process 500 of FIG. 5). The categories may include particular demographics, a particular location (e.g., same zip code, adjacent zip codes, same city, same state, or the like), particular financial events, and the like. For example, how much weight (contribution) did the applicant's income level provide to a reference event in the timeline, how much contribution did the applicant's location provide, how much contribution did particular financial events (e.g., granting or denial of a loan application, job offer, raise at work, and the like), how much contribution did the applicant's age provide, how much contribution did the applicant's profession provide, how much contribution did the applicant's ethnicity provide, how much contribution did the applicant's gender provide, and the like.

At 606, a category may be selected. At 608, a difference between weights in the selected category with weights in the corresponding reference may be determined. At 610, a determination may be made whether the difference satisfies (e.g., is greater than or equal to) a predetermined threshold amount.

In response to determining, at 610, that the difference satisfies the predetermined threshold amount, the process proceeds to 612, where the category is flagged (e.g., as potentially causing biased decisions). The process then proceeds to 614. For example, in a selected category, the weight (contribution) of an event in the timeline of an applicant is compared to the median (or mean, average, standard deviation, or the like) weight of events in the reference of FIG. 5. If the event in the applicant's timeline is being given more weight in the decision-making process than the median (or mean etc.) weight in the reference, than one or more of the rules in the decision-making process may be potentially biased against the selected category. If the difference satisfies a predetermined threshold, indicating potential bias, then the category is flagged for further analysis.

In response to determining, at 610, that the difference does not satisfy (e.g., is less than) the predetermined threshold amount, the process proceeds to 614. If the difference does not satisfy the predetermined threshold, then any bias that may be present does not change the decision.

At 614, a determination is made whether all categories have been processed. In response to determining, at 614, that all the categories have not been processed, the process proceeds to 606, where a next (e.g., unprocessed) category is selected. Thus, the process may repeat 606, 608, 610, 612, and 614 until all the categories have been processed. In response to determining, at 614, that all the categories have been processed, the process proceeds to 616.

At 616, categories that have been flagged (e.g., as potentially causing biased decisions) are selected and, at 618, an analysis (e.g., described in more detail in FIG. 7) of the flagged categories is performed to determine potential bias markers. At 620, results of the analysis, including potential bias markers, may be provided. For example, the weights may be used to automatically create a human-readable explanation for a decision. To illustrate, "Your application was granted based on <set of factors that caused the decision to be "yes">." Or "Your application was denied based on <set of factors that caused the decision to be "no">." The analysis of the flagged categories performed in 618 is described in more detail in FIG. 7.

Thus, weights in an event timeline associated with an applicant may be placed into categories. For example, the categories may have been identified using the process 500 of FIG. 5. Each category may be selected and the weight of the applicant's event may be compared with a corresponding weight of the reference. If the weight of the applicant's event differs from the weight of the reference by more than a threshold amount, then the category is flagged as potentially causing bias in decisions. The flagged categories are analyzed to identify potential bias markers, as described in more detail in FIG. 7.

Figure 7:
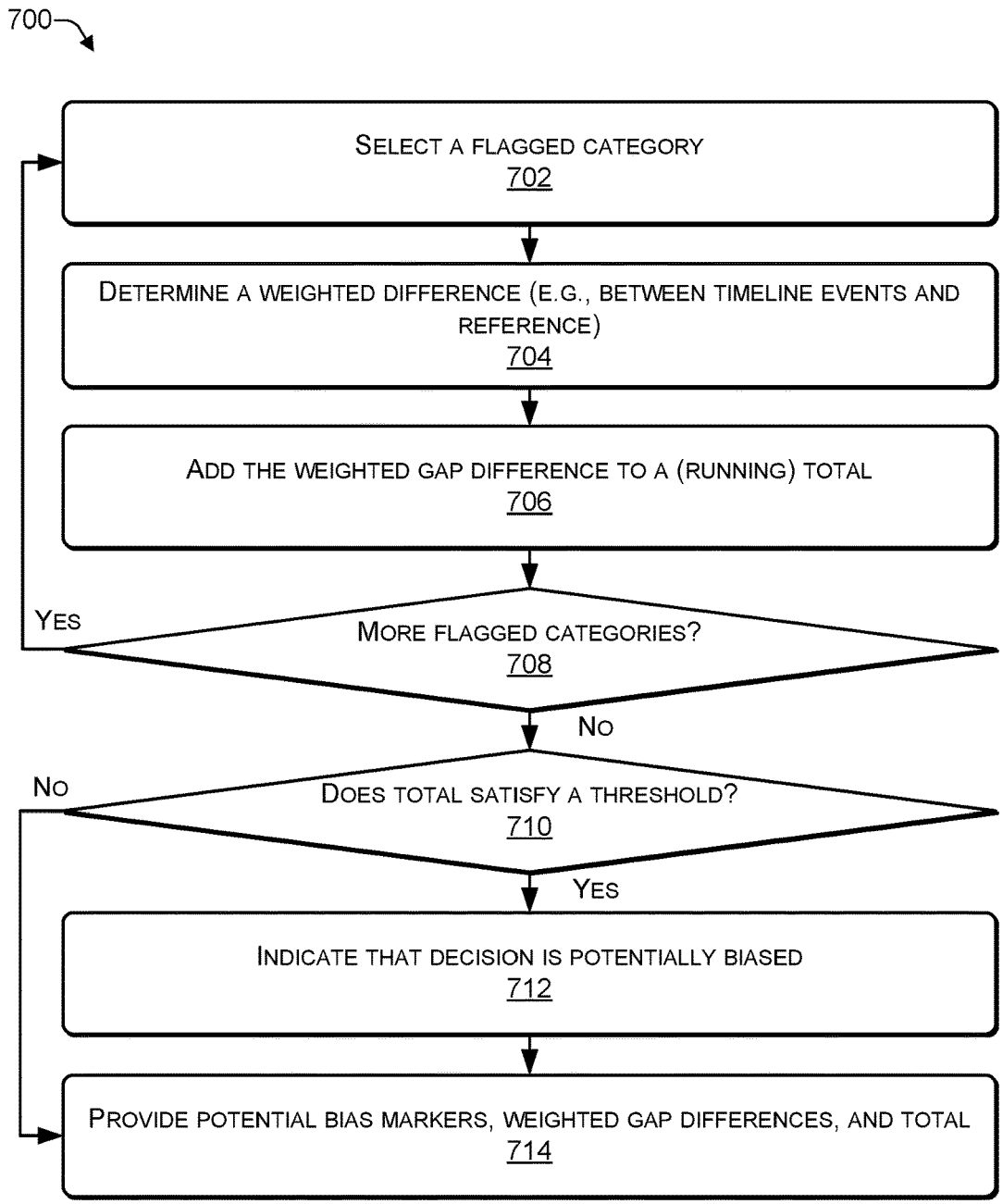
FIG. 7 is a flowchart of a process that includes providing potential bias markers, weighted gap differences, and a total of the weighted gap differences according to some embodiments.

FIG. 7 is a flowchart of a process 700 that includes providing potential bias markers, weighted gap differences, and a total of the weighted gap differences according to some embodiments. For example, the process 700 may be performed by one or more components (e.g., the AI engine 410) of the architecture 400 of FIG. 4.

Typically, a relatively small number of categories may be causing bias in decisions. After identifying (e.g., flagging) categories that may be causing bias (e.g., as described in FIG. 6), the difference between the applicant's timeline event and the reference may be determined. The differences over all categories may be summed. If the sum of the differences over all categories satisfies a threshold, the decision (e.g., made using the applicant's event timeline) is potentially biased.

At 702, a category as flagged as potentially contributing to a biased decision is selected. At 704, a weighted difference between timeline events and a reference data set (e.g., determined in FIG. 5) is determined. The difference represents an absolute value difference between an applicant's timeline events and a reference data set. A weight may be assigned to each category and any sub-categories to reflect their relative importance. The weights assigned to each category and sub-category may be repeatedly modified over time to further reduce bias. The weights may be modified manually or via machine learning (e.g., using the AI engine 400).

At 706, the weighted gap difference is added to a running total that is being maintained. At 708, a determination is made whether there are any more flagged categories. If a determination is made, at 708, that there are more flagged categories, then the process proceeds to 702 and another (e.g., next) flagged category is selected. Thus, the process 700 may repeat 702, 704, 706, and 708, until all the flagged categories (e.g., identified in FIG. 6) have been selected. If a determination is made, at 708, that there are no more flagged categories, then the process proceeds to 710.

At 710, a determination is made whether the running total (e.g., the sum of the weighted differences between the flagged categories and the corresponding reference categories) satisfies a threshold. In response to determining, at 710, that the running total satisfies the threshold, the process proceeds to 712, where an indication that the decision is potentially biased is provided, and the process proceeds to 714. In response to determining, at 710, that the running total does not satisfy the threshold, the process proceeds to 714. At 714, potential bias markers, the weighted gap differences, and the running total are provided. For example, potential bias markers may include a list of events in an applicant's timeline whose weights deviate from the corresponding weights in a reference category, and additional information mapping that category to a business rule, or rules, which use the type of events in the category as input to their decision making.

Thus, for categories that have been flagged (e.g., identified) as potentially biasing (skewing) decisions, the differences between the weight in each flagged category and the weight in the corresponding reference may be summed over all categories. If the sum is determined to satisfy a threshold, the decision may be flagged as potentially biased. If the sum does not satisfy the threshold, the decision is likely unbiased. In either case (biased or unbiased), the potential bias markers, weighted gap differences, and sum total may be provided for further analysis.

Figure 8:
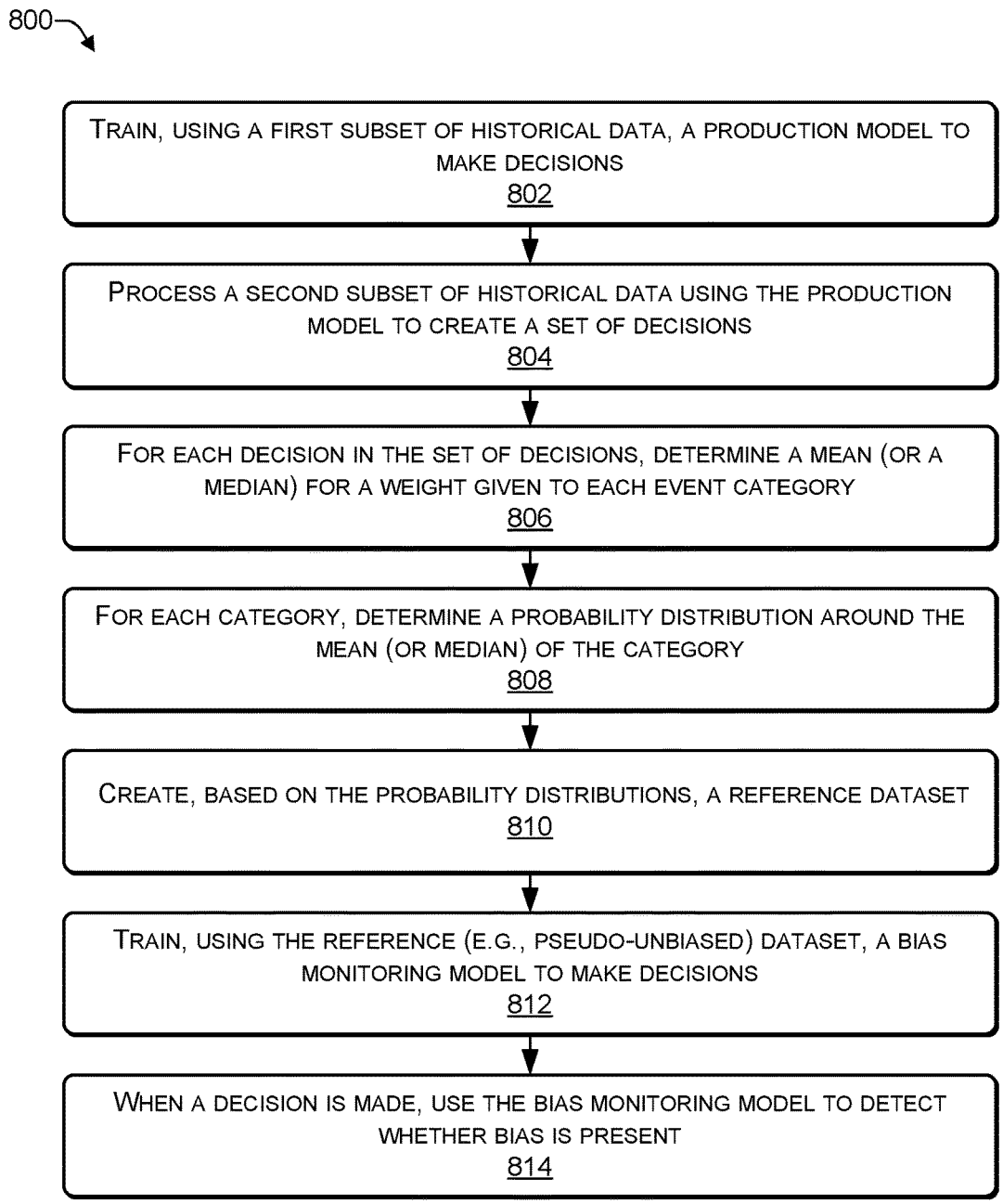
FIG. 8 is a flowchart of a process that includes determining potential bias markers according to some embodiments.
Figure 9:
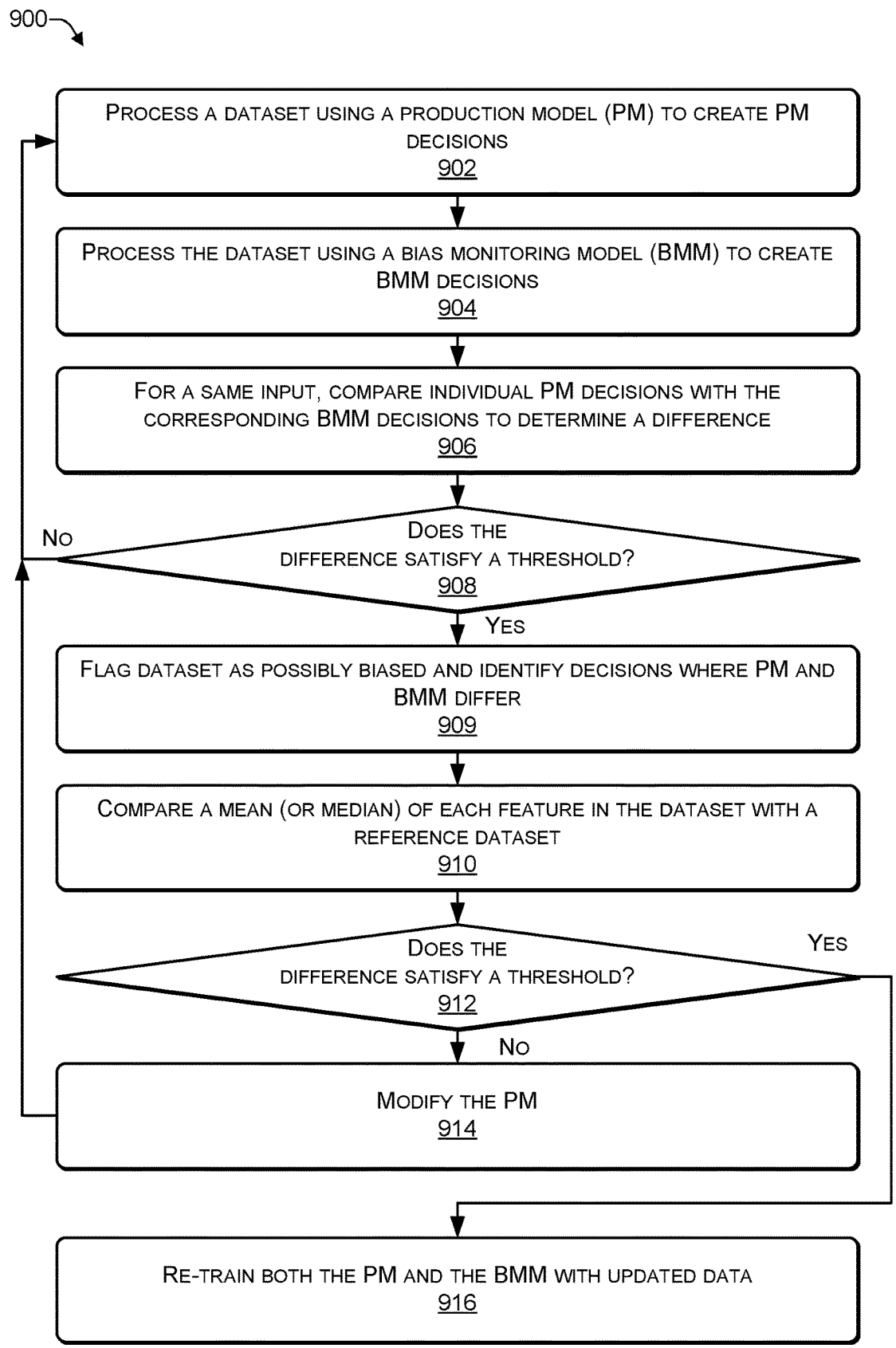
FIG. 9 is a flowchart of a process that includes using a bias monitoring model to detect bias in a set of decisions according to some embodiments.
Figure 10:
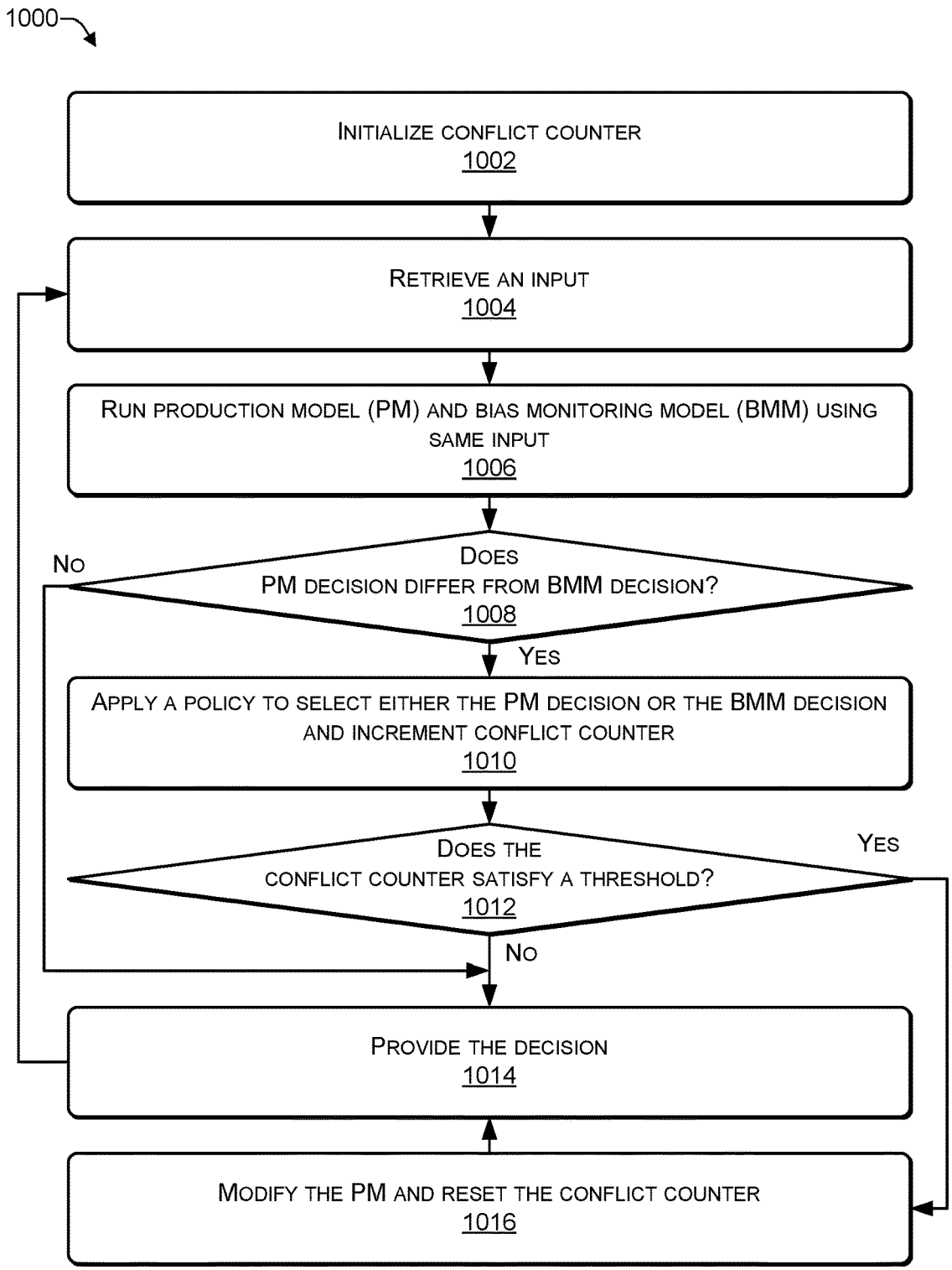
FIG. 10 is a flowchart of a process that includes comparing a decision of a production model with a decision of a bias monitoring model according to some embodiments.

FIG. 8 illustrates how models may be built, FIG. 9 illustrates how the models may be used to process data sets, and FIG. 10 illustrates using the models to process a single record. FIGS. 8, 9, and 10 describe creating a data set in which biases are identified and spread across all categories, rather than bias being concentrated in a few categories (sometimes related categories). The mean or median may be identified for each category. The probability distributions used may depend on the specific categories, e.g., normal for continuous distributions, uniform for discrete distributions, etc.

FIG. 8 is a flowchart of a process 800 that includes determining potential bias markers according to some embodiments. For example, the process 800 may be performed by one or more components (e.g., the AI engine 410) of the architecture 400 of FIG. 4.

At 802, a first subset of historical data (e.g., multiple event timelines) may be used to train a production model (PM). For example, in FIG. 4, a historical data set (e.g., one or more of the data sets 402) may include information associated with multiple individuals or multiple businesses. To illustrate, when making a credit decision regarding whether to extend or deny a loan, the historical data may include event timelines associated with multiple individuals, in some cases associated with millions or even billions of individuals. A subset of the historical data set 402 may be used to train the PM 426. The PM 426 may be used by a decision maker, such as a financial institution, to determine whether to extend or deny credit to an individual or business.

At 804, a second subset of the historical data may be used to train the production model to create a set of decisions. For example, in FIG. 4, the PM 426 may be used to process a subset of the historical data set 402 that includes event timelines associated with multiple (e.g., thousands or hundreds of thousands of) entities (e.g., individuals or businesses) to create a set of decisions. The decisions may be binary, e.g., yes or no decisions (e.g., extend or deny credit/loan, admit or deny admission to a student, etc.). In some cases, the decisions may include an amount, such as an amount of credit/loan to extend, an amount of scholarships to offer, etc.

At 806, for each decision in the set of decisions, a mean (or median) may be determined for a weight given to each event based on the event category. For example, for each category, a mean (or median) weight for events in that category may be identified. The BMM 427 may identify bias by determining that, for a particular decision, the PM 426 is giving a weight to certain types (e.g., categories) of events that deviates from the mean (or median) by more than a predetermined threshold.

At 808, for each category, a probability distribution around the mean (or median) may be determined. The probability distribution used for a particular category may depend on the particular category, e.g., normal for continuous distributions, uniform for discrete distributions, etc. Thus, the events in a category may be analyzed and an appropriate probability distribution selected based on the analysis. The probability distribution may be used to identify what is likely an unbiased weight (falls within a predetermined distance from the mean or median) and what is likely a biased weight (falls on or outside a predetermined distance from the mean or median). Thus, a biased decision may encompass giving too much weight to a particular type (e.g., category) of event or not giving enough weight. For example, the salary of a woman is typically significantly less than a man with a comparable education level and experience. In this example, income level may implicitly bias credit decisions based on gender. To reduce gender bias, the weight given to income level may be reduced.

At 810, a reference data set may be created based on a distribution (e.g., probability distribution) of weights in each category. Each category may have a particular distribution and the distributions may not be the same for all categories. For example, a first category may have a first distribution and a second category may have a second distribution that is different from the first distribution. Thus, a particular distribution may be identified for each category. At 812, the reference data set may be used to train a bias monitoring model (BMM). At 814, when the PM is used to make a decision based on a particular set of data (e.g., an event timeline associated with an individual), the BMM is used to determine whether the decision is biased. Creating a reference data set based on the probability distribution may produce an unbiased (e.g., pseudo unbiased) data set. The reference data set may be created using probability distributions around the mean (or median) of each weight given to events in a category, including outcomes in the same proportion as the size of the set of decisions (e.g., created in 804). Training the BMM using an unbiased data set may enable the BMM to be used to detect bias. For example, when an applicant submits an application, both the PM and the BMM may independently process the event timeline associated with the applicant. The PM may process the event timeline to reach a PM decision and the BMM may process the event timeline associated to reach a BMM decision. Because the BMM has been trained using an unbiased data set, the BMM decision is considered unbiased. If the PM decision is the same (or within a predetermined threshold) as the BMM decision, then the PM decision is unbiased. If the PM decision differs by at least a predetermined threshold from the BMM decision, then the PM decision may be biased.

Thus, process 800 creates a data set where any biases are spread across all features (e.g., weights of categories). In contrast, in a biased data set, bias may be concentrated in few features (e.g., in some cases, the features causing the bias may be related). The probability distributions used may be selected according to the specific features, e.g., normal for continuous, uniform for discrete, etc.

FIG. 9 is a flowchart of a process 900 that includes using a bias monitoring model to detect bias in a set of decisions according to some embodiments. For example, the process 900 may be performed by one or more components (e.g., the AI engine 410) of the architecture 400 of FIG. 4.

At 902, a PM may be used to process a data set to create a first set of decisions, e.g., PM decisions. At 904, a BMM may be used to process the data set (e.g., the same data set that PM processed in 902) to create a second set of decisions, e.g., BMM decisions. At 906, for a same input, individual PM decisions are compared with corresponding BMM decisions. For example, a data set may include multiple event timelines associated with multiple individuals (or businesses) for a specific time period (e.g., a week, a month, a number of months, a year, or the like). The PM may be used to process the data set to produce PM decisions and the BMM may be used to process the same data set to produce BMM decisions. For each particular input (e.g., same event timeline) from the data set, the PM decision for the input is compared with the BMM decision for the input.

At 908, a determination is made whether the difference between a PM decision and a corresponding (e.g., for the same input) BMM decision satisfies a threshold. In response to determining, at 908, that "no" the difference does not satisfy the threshold, the process proceeds to 902, where another data set is processed.

In response to determining, at 908, that "yes" the difference satisfies the threshold (e.g., possibility of bias in the PM decision making), the process proceeds to 909, where the data set is flagged as possibly biased, and decisions where the PM and BMM differ may be identified. At 910, a mean (or median) of each feature (e.g., weight of each category) in the data set is compared with a corresponding feature in a reference data set. If the mean/median of a feature has changed beyond a threshold then the pseudo-unbiased data set may no longer be completely unbiased, e.g., the pseudo-unbiased data set may be outdated. The pseudo-unbiased data set may then be updated.

At 912, a determination is made whether the difference between the mean (or median) of each feature in the data set differs from a corresponding feature in the reference data set satisfies a threshold. In response to determining, at 912, that "no" the difference does not satisfy the threshold, the process proceeds to 914, where the production model is modified to reduce bias. The process then proceeds to 902 where a next data set is processed. If the corresponding mean (or median) of features of the PM 426 and BMM 427 do not differ by more than the threshold amount, then the PM 426 may be biased and is modified. For example, the PM 426 may be adjusted by modifying the PM 426 (e.g., the software model, including the rules used by the PM 426 to make decisions), or by masking or modifying features in the training data used to train the PM 426.

In response to determining, at 912, that "yes" the difference satisfies the threshold (e.g., the data used to train the PM 426 and BMM 427 may be outdated), the process proceeds to 916, where the training data is updated or replaced with more recent data and the updated data is used to re-train both the PM 426 and the BMM 427, as described in the process 800 of FIG. 8.

The process 900 may be used to detect and flag bias and possible causes of the bias in complete data sets (e.g., credit granting decisions in a particular time period), processed one data set at a time, as illustrated in steps 902, 904, 906, 908, and 909. The data sets are processed in parallel, using both the PM 426 and the BMM 427. The process 900 may determine if the reason a data set is being flagged as potentially biased may be because the data set is significantly different from the one used to train the PM 426 and/or BMM 427 models. In some cases, the difference may be caused as a result of one or more external events, e.g., a financial crisis, real estate market crash, etc., or caused by seasonal changes (e.g., a student's income may increase during the summer). To determine if either the PM 426 or the BMM 427 are to be adjusted and re-trained, the means/medians of the data set being tested are compared, in 910, with the corresponding values in the data used to train the PM 426 and the BMM 427. If the values are under a threshold (answer is NO), as tested in 912, it means the BMM 427 is still valid (e.g., makes unbiased decisions and may continue to be used as a reference), and so the bias may be introduced by the PM 426, which may be adjusted, in 914. If, on the other hand, the difference exceeds the threshold in 914 (and the YES path followed), the culprit for the discrepancy may be the differences between the training data and the data set being tested. If this is the case, then a new set of historical data may be used and process 800 performed using the new set of data to retrain the BMM 427.

FIG. 10 is a flowchart of a process 1000 that includes comparing a decision of a production model with a decision of a bias monitoring model according to some embodiments. For example, the process 1000 may be performed by one or more components (e.g., the AI engine 410) of the architecture 400 of FIG. 4.

At 1002, a conflict counter may be initialized (e.g., to zero). At 1004, an input (e.g., an event timeline associated with an individual or a business) may be retrieved. At 1006, a PM may be used to process the input (e.g., to create a PM decision) and a BMM may be used to process the same input (e.g., to create a BMM decision). At 1008, a determination may be made whether the PM decision differs from the BMM decision. For example, the PM may be used to process an event timeline to determine a PM decision, e.g., whether to provide or deny a loan to an individual. The BMM may be used to process the same event timeline to determine a BMM decision. If the decision is binary (yes or no) then a determination may be made whether the PM decision is the same as or different from the BMM decision. If the decision is not binary (e.g., how much credit to extend), then a determination may be made whether a difference between the PM decision and the BMM decision satisfies a threshold.

In response to determining, at 1008, that the PM decision does not differ (or does not differ by more than a threshold) from the BMM decision, then the process proceeds to 1014. If the PM decision and the BMM decision are the same (or differ by less than a threshold amount), then no bias was detected.

In response to determining, at 1008, that the PM decision differs (or differs by at least a threshold amount) from the BMM decision, then the process proceeds to 1010. If the PM decision and the BMM decision are different (or differ by at least a threshold amount), then bias was detected.

At 1010, a policy is applied to select either the PM decision or the BMM decision and the conflict counter is incremented. Thus, each time a conflict between the BMM decision and the PM decision occurs, the conflict counter may be incremented. In some cases, the policy may be set to always favor one of the decisions. To illustrate, because the BMM decision is trained using unbiased data, the policy may favor the BMM decision. As another example, to avoid allegations of biased lending practices, a financial institution may have a policy to grant credit in the case of a conflict, because in such a case, either the BMM decision or the PM decision indicates to grant credit. As a further example, in case of conflict between the BMM decision and the PM decision, the policy may trigger manual (e.g., human) review of the data and the decision. As yet another example, if the BMM decision differs from the PM decision, a third machine learning model may be used as a tie-breaker.

At 1012, a determination may be made whether the conflict counter satisfies a threshold. In response to determining, at 1012, that "no", the conflict counter does not satisfy a threshold (e.g., relatively few conflicts between the BMM decisions and the PM decisions have occurred), then the process proceeds to 1014. In response to determining, at 1012, that "yes", the conflict counter satisfies a threshold amount (e.g., the number of conflicts occurring between the BMM decisions and the PM decisions has crossed a threshold), then the process proceeds to 1016, where the PM is modified (e.g., to reduce bias) and the conflict counter is reset (e.g., initialized to zero). The process then proceeds to 1014. If the BMM and PM produce more than a threshold number of conflicting decisions, then the PM is likely biased and is modified to reduce the bias (e.g., by identifying which features are contributing to the bias and distributing the bias across all features).

At 1014, the decision (e.g., selected by the policy in 1010) is provided. The process then proceeds to 1004 where a next input is retrieved.

Thus, both the BMM and PM are used to process the same input and the corresponding decisions compared. If the decisions are the same (or within a threshold) then bias is not present. If the decisions are different (or differ by at least a threshold amount) then bias may be present and a counter is incremented to keep track of how many conflicting decisions have occurred. A policy may be applied to resolve the conflict between the decisions. If the counter satisfies a threshold, indicating a large number of conflicting decisions, then bias may be present. If bias may be present, the PM is modified by identifying the features causing the bias and reducing the bias.

Figure 11:
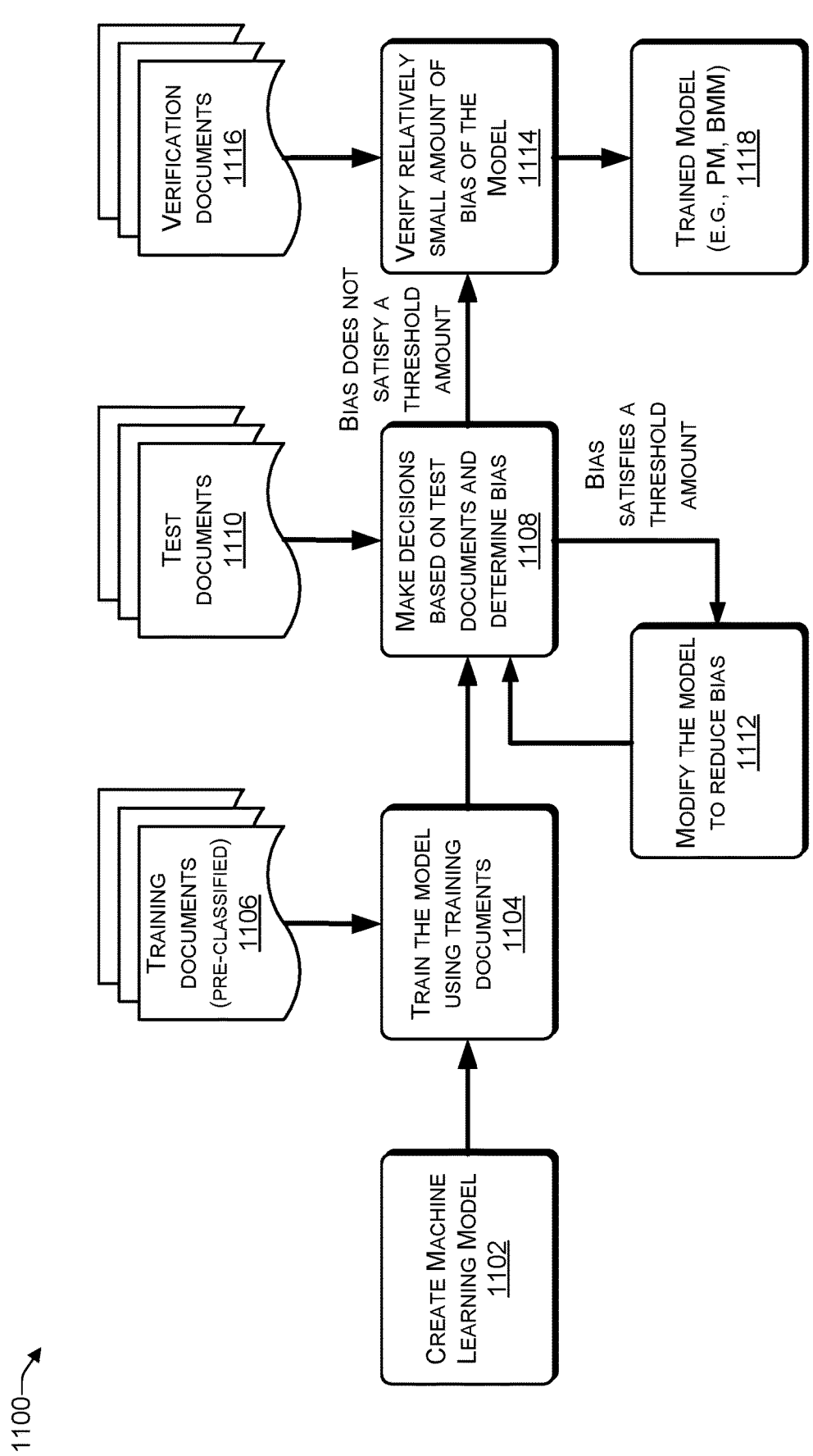
FIG. 11 is a process that includes training a machine learning model according to some embodiments.

FIG. 11 is a process 1100 that includes training a machine learning model (e.g., the PM or the BMM) according to some embodiments. For example, the process 500 may be used to create the PM 426 or the BMM 427 of the architecture 400 of FIG. 4.

At 1102, the model is created (e.g., implemented in software). For example, one or more machine learning algorithms may be coded using software instructions to create the model. The algorithms may implement machine learning, pattern recognition, and other types of algorithms, such as a support vector machine, neural network, Bayesian, or other type of machine learning.

At 1104, the model may be trained using training documents 1106. The training documents 1106 may include event timelines that have been pre-classified (e.g., categorized) into multiple categories (e.g., categories based on demographics, location, income, profession, gender, age, race/ethnicity, outcome, and the like). The training documents 1106 may have been pre-classified by a human, by another model, or a combination thereof.

At 1108, the model may be used to make decisions based on processing test documents 1110. The test documents 1110 may include event timelines with events that have been pre-classified (e.g., categorized) by a human, by another model, or a combination thereof. An amount of bias in the decisions made using the test documents 1110 as input may be determined. If the amount of bias satisfies a predetermined threshold, at 1112 the model may be modified to reduce bias (e.g., by spreading the bias among all features). 1108 and 1112 may be repeated (e.g., iteratively) until the bias does not satisfy (e.g., is less than) the threshold amount.

When the bias of the model in making decisions using the event timelines in the test documents 1110 does not satisfy (e.g., is less than) the predetermined threshold, at 1108, the process may proceed to 1114 where the relatively small amount of bias in decisions made by the model may be verified using verification documents 1116. The verification documents 1116 may include event timelines that have been pre-classified (e.g., categorized) by a human, by another model, or a combination thereof. The verification process may be performed at 1114 to verify that the amount of bias when making decisions does not satisfy the predetermined threshold. For example, the verification documents 1116 may be documents that are different from both the test documents 1110 or the training documents 1106. After verifying, at 1114, that the amount of bias in the model's decisions is less than the threshold amount, the trained model 1118 may be used to process event timelines to make decisions. If the decisions made by the model are found to have an amount of bias that satisfies the predetermined threshold, at 1114, then the model may be trained using additional training documents, at 1104. For example, if the model exhibits a bias when making decisions, the model may be modified to reduce the bias.

Thus, a model may be trained using training documents and tuned (e.g., the algorithms of the model may be modified) to reduce bias to less than a predetermined threshold. The process 1100 may be used to train one or more of the PM 426 or the BMM 427. After the bias of decisions made by the model has been verified as being below a predetermined threshold, the model may be used to make decisions, such as whether to provide or deny a loan (or mortgage) to an individual or a business, whether to provide admission to a university student, and the like.

Figure 12:
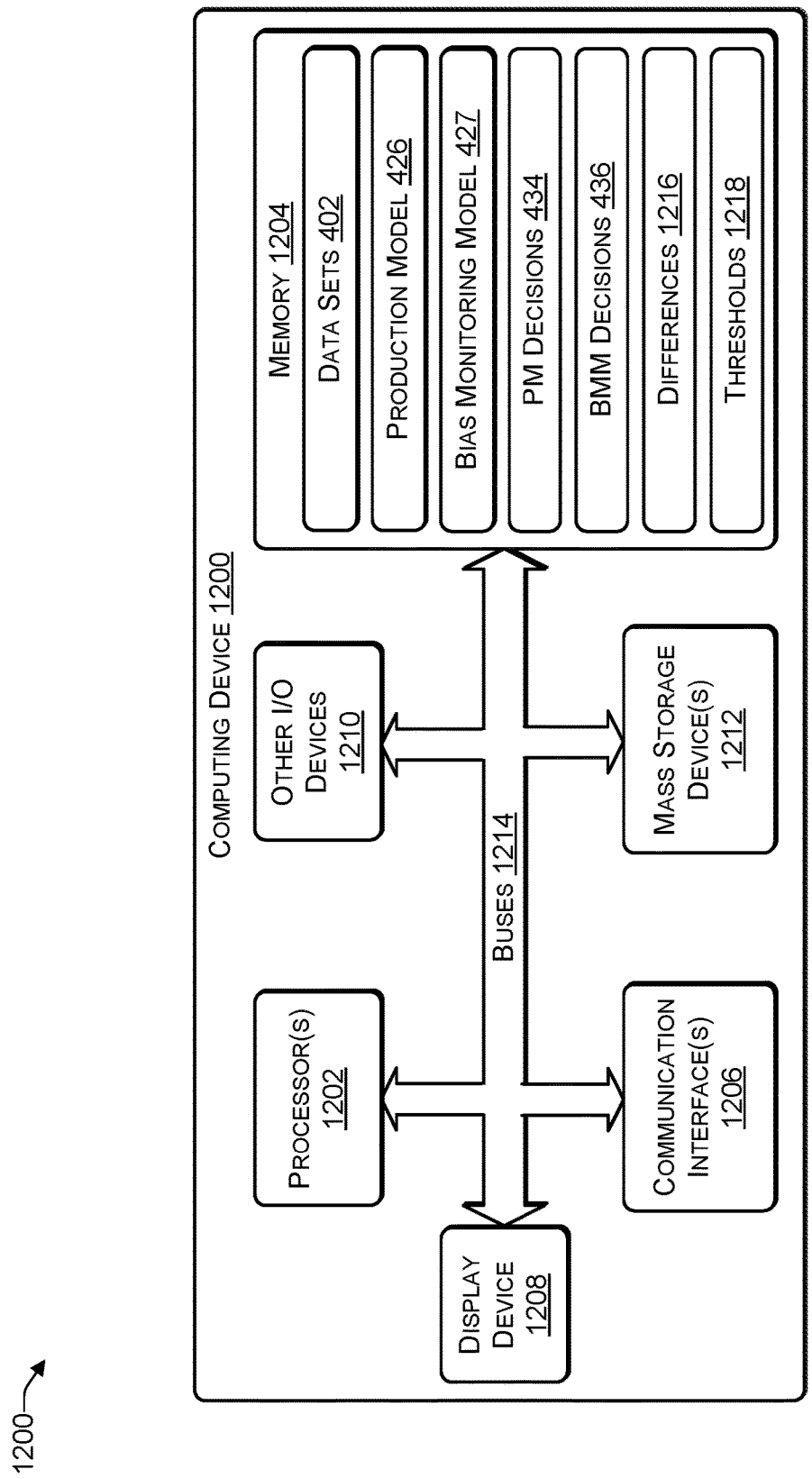
FIG. 12 illustrates an example configuration of a computing device that can be used to implement the systems and techniques described herein.

FIG. 12 illustrates an example configuration of a computing device (e.g., a server or a computing device of a cloud-based computing service provider) 1200 that can be used to implement the systems and techniques described herein. The computing device 1200 may include one or more processors 1202, a memory 1204, communication interfaces 1206, a display device 1208, other input/output (I/O) devices 1210, and one or more mass storage devices 1212, configured to communicate with each other, such as via system buses 1214 or other suitable connection. The system buses 1214 may include multiple buses, such as memory device buses, storage device buses, power buses, video signal buses, and the like. A single bus is illustrated in FIG. 12 purely for ease of understanding.

The processors 1202 are one or more hardware devices that may include a single processing unit or a number of processing units, all of which may include single or multiple computing units or multiple cores. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processor 1202 may be configured to fetch and execute computer-readable instructions stored in the memory 1204, mass storage devices 1212, or other computer-readable media.

Memory 1204 and mass storage devices 1212 are examples of computer storage media (e.g., memory storage devices) for storing instructions that can be executed by the processor 1202 to perform the various functions described herein. For example, memory 1204 may include both volatile memory and non-volatile memory (e.g., RAM, ROM, or the like) devices. Further, mass storage devices 1212 may include hard disk drives, solid-state drives, removable media, including external and removable drives, memory cards, flash memory, floppy disks, optical disks (e.g., CD, DVD), a storage array, a network attached storage, a storage area network, or the like. Both memory 1204 and mass storage devices 1212 may be collectively referred to as memory or computer storage media herein, and may be a media capable of storing computer-readable, processor-executable program instructions as computer program code that can be executed by the processor 1202 as a particular machine configured for carrying out the operations and functions described in the implementations herein.

The computing device 1200 may also include one or more communication interfaces 1206 for exchanging data via a network with other computing devices. The communication interfaces 1206 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1206 can also provide communication with external storage (not shown), such as in a storage array, network attached storage, storage area network, or the like. A display device 1208, such as a monitor may be included in some implementations for displaying information and images to users. Other I/O devices 1210 may be devices that receive various inputs from a user and provide various outputs to the user, and may include a keyboard, a remote controller, a mouse, a printer, audio input/output devices, and so forth.

The computer storage media, such as memory 1204 and mass storage devices 1212, may be used to store software and data. For example, the computer storage media may be used to store the data sets 402, the production model 426, the bias monitoring model 427, the PM decisions 434, the BMM decisions 436, one or more differences 1216, and one or more thresholds 1218. For example, the differences 1216 may include a difference between one of the PM decisions 434 and a corresponding one of the BMM decisions 436, a difference between a mean (or a median) of a distribution in each category, a difference between probability distributions of weights in each category, and the like. The thresholds 1218 are amounts that, when satisfied, indicate that one or more of the decisions 434, 436 may be biased, indicate that one or more of the PM 426 or the BMM 427 may make biased decisions, indicate to train one or more of the PM 426 or the BMM 427 with new (e.g., updated data and/or updated rules), and the like.

Figure 13:
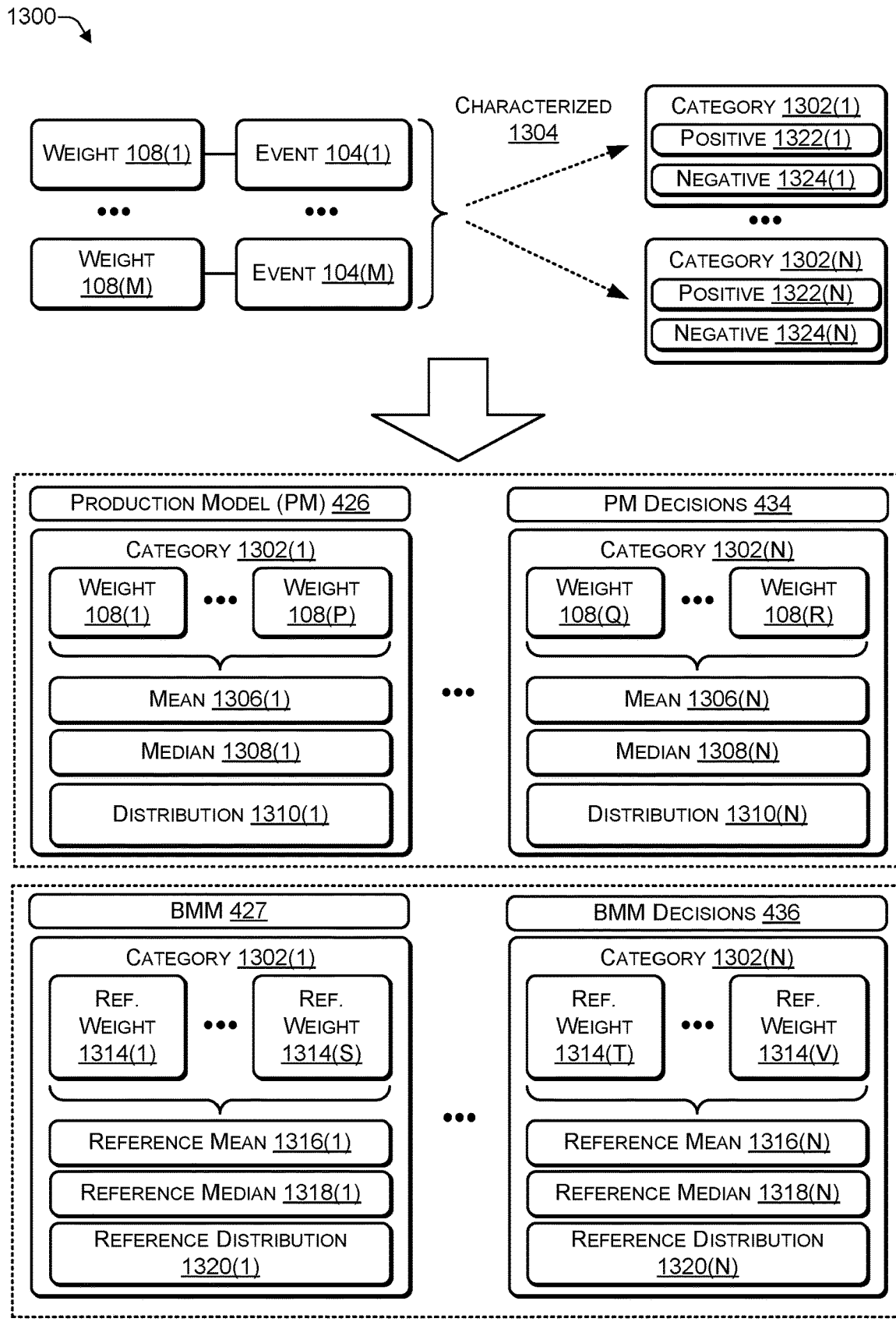
FIG. 13 is a block diagram illustrating using a bias monitoring model (BMM) to determine whether a decision made by a production model (PM) includes bias according to some embodiments.

FIG. 13 is a block diagram illustrating using a bias monitoring model (BMM) to determine whether a decision made by a production model (PM) includes bias according to some embodiments. For example, the PM 426 and the BMM 427 may perform the operations described in FIG. 13.

The corresponding weights (e.g., contributions) 108 may be determined and assigned to the events 104 in each event timeline. Each of the weights 108 may represent a contribution of an individual weight to a reference event, financial capacity, or both. The weights 108(1) to 108(P) in each category may be a weighted sum that indicates the relative importance (e.g., contribution) of each event to the reference event or the financial capacity.

A machine learning model, such as the PM 426 or the BMM 427, may be used to group (e.g., classify) the individual events 104 in the event timelines into multiple categories 1302(1) to 1302(N) (where N>1). The categories 1302 may be grouped based on similar or identical characteristics associated with each of the events 104, such as demographics, location (e.g., same zip code, adjacent zip codes, same city, same state, or the like), financial events, and the like. The demographic categories may include a same or similar occupation, same age, age falls within one of multiple ranges (e.g., 21-25, 26-30, 31-35 etc.), household income falls within one of multiple ranges (e.g., $51,000 to $75,000, $76,000 to $100,000, $101,000 to $125,000, etc.), same or similar level of education (e.g., diploma, Bachelor's degree, Master's degree, PhD degree, medical degree, legal degree, or the like), nationality, religion, ethnicity, and the like. The financial events may include events such as, for example, paying off a loan (or mortgage), an income level or income bracket, loan (or mortgage) default, late payment(s) on a loan (or mortgage), laid off from job, declaring bankruptcy, and the like. When grouping the events 104 in event timelines into the categories 1302, the model may, for example, group similarly named events into a category, group events in a predefined "class" (e.g., internal or external, financial or social, direct or indirect), and the like. In some cases, an iterative process may be used to create a hierarchical set of categories. For example, the model may group events into broad categories (e.g., internal or external), then group events in the broad categories into narrower categories, group events in the narrower categories into even narrower categories, and so on. Thus, an individual category with more than a threshold number of events may be analyzed and sub-divided into narrower categories, and so on until there are no categories with more than the threshold number of events. The events 104 may be characterized 1304 in each category based on a type of the event. For example, the events 104 may be characterized into positive outcome events 1322 and negative outcome events 1324. Positive outcome events 1322 may include events that increase an individual's financial capacity, e.g., higher paying job, raise at work, loan payment, and the like, while negative outcome events 1324 may include events that decrease an individual's financial capacity, e.g., loss of job, accepting a new job that pays less than a previous job, missed payment on a loan, default on a loan, and the like.

Each category 1302(1) to 1302(N) may include a portion of the events 104 and the corresponding weights 108. For example, the category 1302(1) may include the weights 108(1) to 108(P) (P>0, P<N) and the category 1302(N) may include the weights 108(Q) to 108(R) (Q<N, R<N). The weights 108(1) to 108(P) may be mathematically analyzed to determine a mean 1306(1) of the weights 108(1) to 108(P), a median 1308(1) of the weights 108(1) to 108(P), a distribution 1310(1) (e.g., probability distribution) of the weights 108(1) to 108(P), or any combination thereof. The weights 108(Q) to 108(R) may be mathematically analyzed to determine a mean 1306(N) of the weights 108(Q) to 108(R), a median 1308(N) of the weights 108(Q) to 108(R), a distribution 1310(N) of the weights 108(Q) to 108(R), or any combination thereof.

Individual ones of the multiple categories 1302 may be selected and the events 104 in a selected one of the categories 1302 may be separated based on an event outcome associated with each event. For example, each category may include events with positive outcomes (e.g., loan approval, mortgage approval, job offer, paid off loan, paid off credit card, and the like) and negative outcomes (e.g., missed loan payment, defaulted on loan, was laid off or fired from job, and the like). To illustrate, positive outcome may be events that increased financial capacity, while negative outcome may be events that decreased financial capacity. For a model (e.g., a classifier) that makes binary decisions (e.g., yes or no), the outcomes may be classified as either a positive outcome (e.g., loan was granted) or a negative outcome (e.g., loan was denied). For a model that makes non-binary decisions, the classifications may be further refined. For example, an individual (or a business) may apply for a $200,000 loan (e.g., home mortgage) but may be granted a $160,000 loan. In this example, the result is 80% positive because the applicant received 80% of the requested loan amount.

Individual event outcomes in the selected one of the categories 1302 may be characterized using the characterizations 1304. For example, a mathematical analysis may be performed for each one of the categories 1302 to determine a mean 1306 of each one of the categories 1302, a median 1308 of each one of the categories 1302, a distribution 1310 of each one of the categories 1302, or any combination thereof. The mathematical analysis may take into consideration the weights of the particular category as a whole, individual weights of individual events in each category, or using event type granularity, taking into account time proximity to a reference event, etc. The mathematical analysis may be done via machine learning models.

For the BMM 427, the characterizations 1304 may be modified based on the mathematical analysis to create a reference. For example, the characterizations 1304 of the events 104 may be examined (e.g., by a human, by a machine learning algorithm, or both) to determine whether any characterizations should be added, removed, or modified to increase bias detection. The resulting characterizations 1304 may be used as an unbiased (e.g., pseudo-unbiased) reference to detect bias. For example, category 1302(1) may include weights 1314(1) to 1314(S) (S>0, S<N) and the category 1302(N) may include the weights 1314(T) to 1314(V) (T<N, V<N). The reference weights 1314(1) to 1314(S) may be mathematically analyzed to determine a reference mean 1316(1), a reference median 1318(1), and a reference distribution 1320(1). The reference weights 1314(T) to 1314(V) may be mathematically analyzed to determine a reference mean 1316(N), a reference median 1318(N), and a distribution 1320(N). In some cases, the reference weights 1314 may be repeatedly (e.g., iteratively) modified to reduce bias and enable the reference weights 1314 to be used as unbiased references for comparison purposes. In addition, secondary weights may be assigned to the reference weights 1314, e.g., some of the reference weights may be given more importance (e.g., weight) than others of the reference weights.

After the PM 426 makes a decision (e.g., one of the PM decisions 434), the decision may be compared a corresponding one of the BMM decisions 436 made by the BMM 427. The mathematical analysis of the weights 108 in each of the categories 1302 may be compared with reference weights 1314 in the corresponding categories. For example, each of the means 1306 may be compared with the corresponding one of the reference means 1316 (e.g., 1306(N) compared to 1316(N)), each of the medians 1308 may be compared with the corresponding one of the reference medians 1318 (e.g., 1308(N) compared to 1318(N)), each of the distributions 1310 may be compared with the corresponding one of the reference distributions 1320 (e.g., 1320(N) compared to 1320(N)). If the comparisons reveal a difference that exceeds predetermined thresholds, then bias may be present. For example, the PM 426 may be weighting certain categories of events higher or lower than the BMM 427, causing the decisions made by the PM 426 to be biased.

Figure 14:
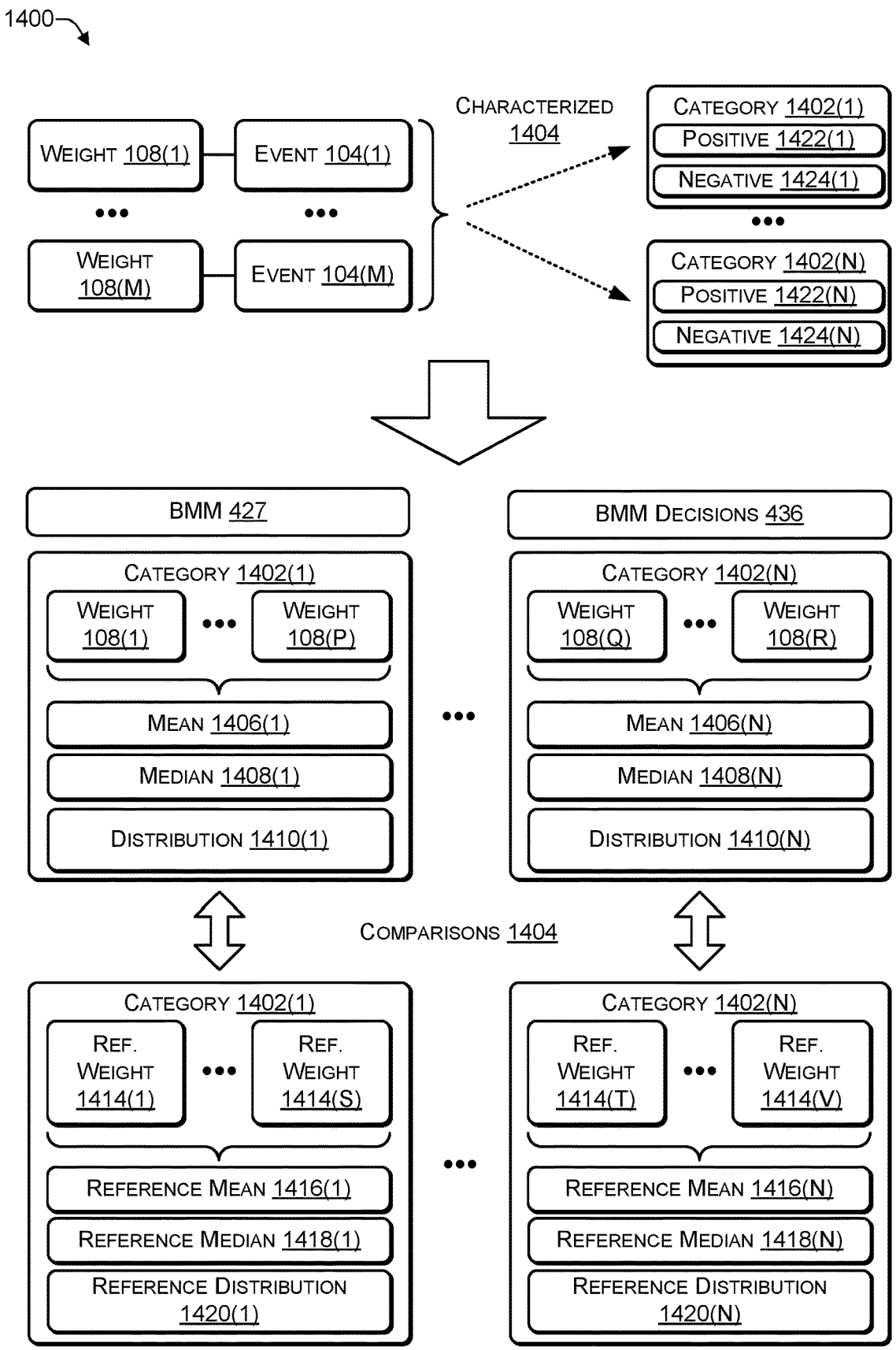
FIG. 14 is a block diagram illustrating using a bias monitoring model (BMM) to make decisions and to determine whether any one of the decisions includes bias according to some embodiments.

FIG. 14 is a block diagram illustrating using a bias monitoring model (BMM) to make decisions and to determine whether any one of the decisions includes bias according to some embodiments. For example, the BMM 427 may perform the operations described in FIG. 14.

The BMM 427 may determine and assign corresponding weights 108 (e.g., contribution) to the events 104 in each event timeline. Each of the weights 108 may represent a contribution of an individual weight to a reference event, financial capacity, or both.

A machine learning model, such as the BMM 427, may be trained using unbiased (or pseudo-unbiased) data. When an applicant applies for credit, admission, or the like, the BMM 427 group (e.g., classify) the individual events 104 in the event timeline into multiple categories 1402(1) to 1402(N) (where N>1). The categories 1402 may be grouped based on similar or identical characteristics associated with each of the events 104, such as demographics, location (e.g., same zip code, adjacent zip codes, same city, same state, or the like), financial events, and the like. When grouping the events 104 in event timelines into the categories 1402, the BMM 427 may, for example, group similarly named events into a category, group events in a predefined "class" (e.g., internal or external, financial or social, direct or indirect), and the like. In some cases, an iterative process may be used to create a hierarchical set of categories. For example, the model may group events into broad categories (e.g., internal or external), then group events in the broad categories into narrower categories, group events in the narrower categories into even narrower categories, and so on. Thus, an individual category with more than a threshold number of events may be analyzed and sub-divided into narrower categories, and so on until there are no categories with more than the threshold number of events. The events 104 may be characterized 1404 in each category based on a type of the event. For example, the events 104 may be characterized into positive outcome events 1422 and negative outcome events 1424. Positive outcome events 1422 may include events that increase an individual's financial capacity, e.g., higher paying job, raise at work, loan payment, and the like, while negative outcome events 1424 may include events that decrease an individual's financial capacity, e.g., loss of job, accepting a new job that pays less than a previous job, missed payment on a loan, default on a loan, and the like.

Each category 1402(1) to 1402(N) may include a portion of the events 104 and the corresponding weights 108. For example, the category 1402(1) may include the weights 108(1) to 108(P) (P>0, P<N) and the category 1402(N) may include the weights 108(Q) to 108(R) (Q<N, R<N). The weights 108(1) to 108(P) may be mathematically analyzed to determine a mean 1406(1) of the weights 108(1) to 108(P), a median 1408(1) of the weights 108(1) to 108(P), a distribution 1410(1) (e.g., probability distribution) of the weights 108(1) to 108(P), or any combination thereof. The weights 108(Q) to 108(R) may be mathematically analyzed to determine a mean 1406(N) of the weights 108(Q) to 108(R), a median 1408(N) of the weights 108(Q) to 108(R), a distribution 1410(N) of the weights 108(Q) to 108(R), or any combination thereof.

Individual ones of the multiple categories 1402 may be selected and the events 104 in a selected one of the categories 1402 may be separated based on an event outcome associated with each event. For example, each category may include events with positive outcomes (e.g., loan approval, mortgage approval, job offer, paid off loan, paid off credit card, and the like) and negative outcomes (e.g., missed loan payment, defaulted on loan, was laid off or fired from job, and the like). To illustrate, positive outcome may be events that increased financial capacity, while negative outcome may be events that decreased financial capacity. For a model (e.g., a classifier) that makes binary decisions (e.g., yes or no), the outcomes may be classified as either a positive outcome (e.g., loan was granted) or a negative outcome (e.g., loan was denied). For a model that makes non-binary decisions, the classifications may be further refined. For example, an individual (or a business) may apply for a $200,000 loan (e.g., home mortgage) but may be granted a $160,000 loan. In this example, the result is 80% positive because the applicant received 80% of the requested loan amount.

A mathematical analysis may be performed for each one of the categories 1402 to determine a mean 1406 of each one of the categories 1402, a median 1408 of each one of the categories 1402, a distribution 1410 of each one of the categories 1402, or any combination thereof. The mathematical analysis may take into consideration the weights of the particular category as a whole, individual weights of individual events in each category, or using event type granularity, taking into account time proximity to a reference event, etc. The mathematical analysis may be done via machine learning models.

The BMM 427 may analyze the applicant's event timeline and place each of the events into multiple categories. For example, category 1402(1) may include weights 1414(1) to 1414(S) (S>0, S<N) and the category 1402(N) may include the weights 1414(T) to 1414(V) (T<N, V<N). The reference (e.g., unbiased) weights 1414(1) to 1414(S) may be mathematically analyzed to determine a reference mean 1416(1), a reference median 1416(1), and a reference distribution 1420(1). The reference weights 1414(T) to 1414(V) may be mathematically analyzed to determine a reference mean 1416(N), a reference median 1418(N), and a distribution 1420(N). The reference weights 1414, reference means 1416, reference medians 1418, and reference distributions 1420 may be used as a reference because they are created to be unbiased references.

After the BMM 427 makes a decision (e.g., one of the BMM decisions 436), based on an applicant's event timeline, the weights 108 assigned to events in the applicant's timeline may be compared to the corresponding reference weights 1414, the means 1406 may be compared with the corresponding one of the reference means 1416, each of the medians 1408 may be compared with the corresponding one of the reference medians 1418 (e.g., 1408(N) compared to 1418(N)), each of the distributions 1410 may be compared with the corresponding one of the reference distributions 1420 (e.g., 1410(N) compared to 1420(N)), or any combination thereof. If comparisons 1404 reveal one or more differences that exceeds predetermined thresholds, then bias may be present and the BMM 427 may be modified or retrained to reduce the bias.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method performed by one or more processors configured with operational instructions, the method comprising:
   determining an event timeline that comprises one or more finance-related events associated with a person;
   determining, using a production classifier that is trained using historical data, an individual contribution of each event in the event timeline to a financial capacity of the person;
   determining, using the production classifier and based on a first set of the contributions, a first decision whether to extend credit to the person;
   determining, using a bias monitoring classifier that is trained using unbiased or pseudo-unbiased data and based on the event timeline, a second decision whether to extend credit to the person;
   determining a difference between the first decision and the second decision;
   determining that the difference between the first decision and the second decision satisfies a first threshold;
   adjusting a value indicative of a conflict count in response to determining that the difference between the first decision and the second decision satisfies the first threshold;
   determining that the value indicative of the conflict count satisfies a second threshold;
   modifying the production classifier or bias monitoring classifier by masking or modifying features in training data, the modifying of the production classifier or bias monitoring classifier being to remove or reduce bias; and
   selecting, based on a policy, either the first decision or the second decision.

2. The method of claim 1, further comprising:
   grouping individual events in the event timeline into a plurality of categories.

3. The method of claim 2, wherein individual categories of the plurality of categories include one or more demographics, one or more locations, one or more financial events, and one or more educational levels.

4. The method of claim 2, further comprising:
   for each category, characterizing individual events as having either a positive outcome or a negative outcome, wherein:
   a positive outcome increases the financial capacity of the person, and
   a negative outcome decreases the financial capacity of the person.

5. The method of claim 2, further comprising:
   for a set of contributions grouped into each category, determining a probability distribution associated with the set of contributions.

6. The method of claim 5, further comprising:
   determining a mean or median of the probability distribution.

7. The method of claim 1, further comprising:
   training the bias monitoring classifier using pseudo unbiased data.

8. The method of claim 1, wherein the one or more finance-related events comprise:
   internal events comprising a loan approval, use of a bank overdraft, a loan payment, a payroll deposit, or a credit limit increase; and
   external events comprising finance-related social media posts, a change to a bank rate, an unemployment statistic, or an economic statistic.

9. The method of claim 1, further comprising:
   determining that the first decision includes bias based at least in part on (i) the second decision and (ii) the difference between the first decision and the second decision; and
   modifying the production classifier to reduce the bias.

10. The method of claim 1, wherein adjusting the value indicative of the conflict count comprises:
    incrementing a conflict counter in response to determining that the difference between the first decision and the second decision satisfies the first threshold.

11. One or more non-transitory computer-readable media storing instructions executable by one or more processors to perform operations comprising:
    determining an event timeline that comprises one or more finance-related events associated with a person;
    determining, using a production classifier that is trained using historical data, an individual contribution of each event in the event timeline to a financial capacity of the person;

determining, using the production classifier and based on a first set of the contributions, a first decision whether to extend credit to the person;

determining, using a bias monitoring classifier that is trained using unbiased or pseudo-unbiased data and based on the event timeline, a second decision whether to extend credit to the person;

determining a difference between the first decision and the second decision;

determining that the difference between the first decision and the second decision satisfies a first threshold;

adjusting a value indicative of a conflict count in response to determining that the difference between the first decision and the second decision satisfies the first threshold;

determining that the value indicative of the conflict count satisfies a second threshold;

modifying the production classifier or bias monitoring classifier by masking or modifying features in training data, the modifying of the production classifier or bias monitoring classifier being to remove or reduce bias; and selecting, based on a policy, either the first decision or the second decision.

12. The one or more non-transitory computer-readable media of claim 11, wherein the operations further comprise:
grouping individual events in the event timeline into a plurality of categories.

13. The one or more non-transitory computer-readable media of claim 12, wherein the operations further comprise:
for a set of contributions grouped into each category, determining:
a probability distribution associated with the set of contributions; and
determining a mean or a median of the probability distribution.

14. The one or more non-transitory computer-readable media of claim 12, wherein the operations further comprise:
training the bias monitoring classifier using pseudo unbiased data.

15. The one or more non-transitory computer-readable media of claim 11, wherein the operations further comprise:
determining that the first decision includes bias based at least in part on (i) the second decision and (ii) the difference between the first decision and the second decision; and
modifying the production classifier to reduce the bias.

16. The one or more non-transitory computer-readable media of claim 11, wherein adjusting the value indicative of the conflict count comprises:

incrementing a conflict counter in response to determining that the difference between the first decision and the second decision satisfies the first threshold.

17. A computing device comprising:
one or more processors; and
one or more non-transitory computer-readable media storing instructions executable by the one or more processors to perform operations comprising:
determining an event timeline that comprises one or more finance-related events associated with a person;
determining, using a bias monitoring classifier that is trained using unbiased or pseudo-unbiased data, an individual contribution of each event in the event timeline to a financial capacity of the person;
grouping, using the bias monitoring classifier, individual events in the event timeline into a plurality of categories based in part on a type of the individual events;
determining, using the bias monitoring classifier and based on a first set of the contributions, a decision whether to extend credit to the person;
determining that the decision includes bias;
adjusting a value indicative of a conflict count based at least in part on determining that the decision is biased; determining that the value indicative of the conflict count satisfies a threshold;
retraining the bias monitoring classifier using updated data after determining that the conflict count satisfies the threshold; and
retraining the bias monitoring classifier using updated data.

18. The computing device of claim 17, wherein the operations further comprise:
performing a mathematical analysis of events in individual categories of the plurality of categories, the mathematical analysis including determining at least one of a mean, a median, or a distribution of the contributions associated with the events in the individual categories.

19. The computing device of claim 18, wherein the operations further comprise:
determining that the decision includes bias based at least in part on comparing the mathematical analysis of the events in the individual categories with a reference mathematical analysis of reference events in the corresponding individual categories.

20. The computing device of claim 17, wherein:
adjusting the value indicative of the conflict count comprises incrementing a conflict counter based at least in part on determining that the decision is biased.

* * * * *